United States Patent
Bumgardner et al.

(10) Patent No.: US 9,565,389 B2
(45) Date of Patent: Feb. 7, 2017

(54) SYSTEMS AND METHODS FOR RECORDING OVERLAPPING MEDIA CONTENT DURING SCHEDULING CONFLICTS

(71) Applicant: Rovi Guides, Inc., San Carlos, CA (US)

(72) Inventors: James A. Bumgardner, Shadow Hills, CA (US); Geoffrey Z. Ombao, Pacific Palisades, CA (US); Gregory L. DeCamp, Simi Valley, CA (US); Haig H. Krakirian, Burbank, CA (US)

(73) Assignee: Rovi Guides, Inc., San Carlos, CA (US)

(*) Notice: Subject to any disclaimer, the term of this patent is extended or adjusted under 35 U.S.C. 154(b) by 0 days.

(21) Appl. No.: 14/303,785

(22) Filed: Jun. 13, 2014

(65) Prior Publication Data

US 2014/0294363 A1 Oct. 2, 2014

Related U.S. Application Data

(63) Continuation of application No. 11/825,311, filed on Jul. 3, 2007, now Pat. No. 8,798,433.

(Continued)

(51) Int. Cl.
*H04N 5/76* (2006.01)
*H04N 5/782* (2006.01)
(Continued)

(52) U.S. Cl.
CPC ............... *H04N 5/76* (2013.01); *H04N 5/782* (2013.01); *H04N 21/4312* (2013.01);
(Continued)

(58) Field of Classification Search
CPC .... H04N 21/485; H04N 21/4583; H04N 5/76; H04N 21/4821; H04N 21/4334; H04N 21/47214; H04N 21/8545; H04N 21/4147; H04N 21/443; H04N 21/458; H04N 21/4622; H04N 21/47
(Continued)

(56) References Cited

U.S. PATENT DOCUMENTS

| 6,185,360 B1 | 2/2001 | Inoue et al. |
| 2001/0004418 A1 | 6/2001 | Nagano et al. |

(Continued)

FOREIGN PATENT DOCUMENTS

| EP | 1173016 | 1/2002 |
| EP | 1187467 | 3/2002 |

(Continued)

OTHER PUBLICATIONS

International Search Report for PCT/US2008/005177 mailed Jul. 14, 2008 (now known as WO-2008136925).

(Continued)

*Primary Examiner* — Thai Tran
*Assistant Examiner* — Jose Mesa
(74) *Attorney, Agent, or Firm* — Ropes & Gray LLP

(57) ABSTRACT

In many aspects, systems and methods for recording overlapping media content using interactive media guidance applications are provided. The systems and methods for recording overlapping media content generally relate to cropping overlapping portions of the media content thereby allowing a user to enjoy most of the recording wile only forgoing a portion of the beginning or the end of a program.

20 Claims, 19 Drawing Sheets

Related U.S. Application Data

(60) Provisional application No. 60/927,862, filed on May 4, 2007.

(51) Int. Cl.
    *H04N 21/458* (2011.01)
    *H04N 21/485* (2011.01)
    *H04N 21/431* (2011.01)
    *H04N 21/433* (2011.01)
    *H04N 21/472* (2011.01)
    *H04N 21/482* (2011.01)
    *H04N 21/426* (2011.01)
    *H04N 21/44* (2011.01)

(52) U.S. Cl.
    CPC ..... *H04N 21/4334* (2013.01); *H04N 21/4583* (2013.01); *H04N 21/47214* (2013.01); *H04N 21/485* (2013.01); *H04N 21/4821* (2013.01); *H04N 21/4263* (2013.01); *H04N 21/44016* (2013.01)

(58) Field of Classification Search
    USPC .......................................................... 386/293
    See application file for complete search history.

(56) References Cited

U.S. PATENT DOCUMENTS

| | | | |
|---|---|---|---|
| 2002/0054068 A1* | 5/2002 | Ellis | H04N 5/44543 715/716 |
| 2002/0120931 A1* | 8/2002 | Huber | H04N 7/17318 725/34 |
| 2003/0106071 A1 | 6/2003 | Akamatsu | |
| 2003/0204848 A1 | 10/2003 | Cheng et al. | |
| 2004/0013409 A1 | 1/2004 | Beach | |
| 2004/0078811 A1 | 4/2004 | Urdang | |
| 2004/0078817 A1 | 4/2004 | Horowitz et al. | |
| 2004/0208477 A1 | 10/2004 | Bumgardner et al. | |
| 2006/0037048 A1* | 2/2006 | DeYonker | H04N 5/44543 725/58 |
| 2006/0051059 A1 | 3/2006 | Krakirian et al. | |
| 2006/0064721 A1* | 3/2006 | Del Val | H04N 5/44543 725/41 |
| 2006/0104611 A1 | 5/2006 | Gildred et al. | |
| 2006/0153523 A1 | 7/2006 | Ishida et al. | |
| 2006/0179462 A1 | 8/2006 | Willame et al. | |
| 2007/0079334 A1 | 4/2007 | Silver | |
| 2008/0196065 A1 | 8/2008 | Cheng et al. | |
| 2008/0273856 A1 | 11/2008 | Bumgardner et al. | |

FOREIGN PATENT DOCUMENTS

| | | |
|---|---|---|
| EP | 1187467 A2 | 3/2002 |
| JP | 2002-94916 | 3/2002 |
| JP | 2006-140826 | 6/2006 |
| WO | WO-02039729 | 5/2002 |
| WO | WO-2006127211 | 11/2006 |
| WO | WO-2007038434 A2 | 4/2007 |

OTHER PUBLICATIONS

International Preliminary Report on Patentability and Written Opinion of the International Searching Authority for PCT/US2008/005177 mailed Nov. 19, 2009.

* cited by examiner

US 9,565,389 B2

SYSTEMS AND METHODS FOR RECORDING OVERLAPPING MEDIA CONTENT DURING SCHEDULING CONFLICTS

CROSS-REFERENCE TO RELATED APPLICATIONS

This application is a continuation of U.S. patent application Ser. No. 11/825,311, filed Jul. 3, 2007, (allowed), which claims priority to and the benefit of U.S. Provisional Patent Application Ser. No. 60/927,862, filed on May 4, 2007, (expired), all of which are hereby incorporated by reference herein in their entireties.

BACKGROUND OF THE INVENTION

This invention relates generally to media systems, and more particularly, to systems and methods for recording overlapping media content using interactive media guidance applications.

Media devices generally include tuners to receive media content such as television programs from external media sources. Some media devices also include recorders to record the received media content for later viewing. Depending on the number of tuners available in the media device, a user may be able to view and/or record more than one stream of media content simultaneously. However, due to physical limitations in these media devices, the number of tuners is usually restricted and typical at-home set-top boxes include one or two tuners.

The number of tuners in a user's equipment limits the amount of media content a user can watch and/or record simultaneously. When the number of simultaneous recordings and viewings exceed this limit, a scheduling conflict arises. One approach to resolving a recording conflict is to cancel the recording of one of the programs. In other words, programs are either recorded in their entirety or not recorded at all. When two programs only overlap a few minutes, perhaps in a way that has no impact on the desirability of watching both programs, one of the recordings is cancelled.

SUMMARY OF THE INVENTION

In accordance with the principles of the present invention, systems and methods for recording overlapping media content using interactive media guidance applications are provided. For purposes of clarity, and not by way of limitation, the systems and methods may sometimes be described herein in the context of recording and cropping overlapping media content for video-based media content, such as television programs (referred to herein, at times, as simply "programs"). However, it may be understood that the systems and methods of the present invention may be applied to any other suitable type of media content, including audio-based media content.

The various embodiments described herein, generally speaking, crop overlapping portions of the media content thereby allowing a user to enjoy most of the recording while only forgoing a portion of the beginning or the end of a program.

In some embodiments, the systems and methods described herein include methods for simultaneously recording multiple programs. Control circuitry of user's equipment receives (via user input interfaces and applications such as an interactive media guidance application and interactive television program guides) a user input to record a program and determines whether the requested program overlaps with another program already scheduled for recording. The overlap may occur at the beginning, end or in the middle of a program. As an example, the beginning portion of one program may overlap with the end portion of the other program.

When an overlap is detected, the control circuitry may always crop one of the two programs or, in some embodiments, it may determine whether cropping is appropriate. For example, it may be inappropriate to crop a recording when the amount of overlap (and necessary cropping) is too much to allow the user to follow the program or watch its important parts. The control circuitry may compare the amount of time the two programs overlap to a threshold value (e.g., ten minutes) and crop a recording when the overlap is less than the threshold value.

Regardless of whether cropping occurs in all instances of overlap or not, the control circuitry selects one of the recordings to crop. In certain embodiments, the recording with the lower recording priority is selected for cropping. Recording priorities may be part of recording settings or options set by the user, or they may be automatically set by the control circuitry, or they may be a combination of both. For example, the application may assign the last-scheduled recording to have the lower recording priority. Alternatively, the program that is scheduled for recording earlier may have the lower recording priority. Or, as another example, recording priorities may be based on one or more program attributes such as whether the program is a single instance or a series type program (e.g., series recordings may be a higher priority relative to one-off recordings). In certain embodiments, a user may be provided the option of re-recording programs that were previously cropped. The user may re-record, a program in its entirety or they may record the previously cropped portion.

BRIEF DESCRIPTION OF THE DRAWINGS

The above and other objects and advantages of the invention will be apparent upon consideration of the following detailed description, taken in conjunction with the accompanying drawings, in which like reference characters refer to like parts throughout, and in which.

DETAILED DESCRIPTION OF THE PREFERRED EMBODIMENTS

Figure 1:
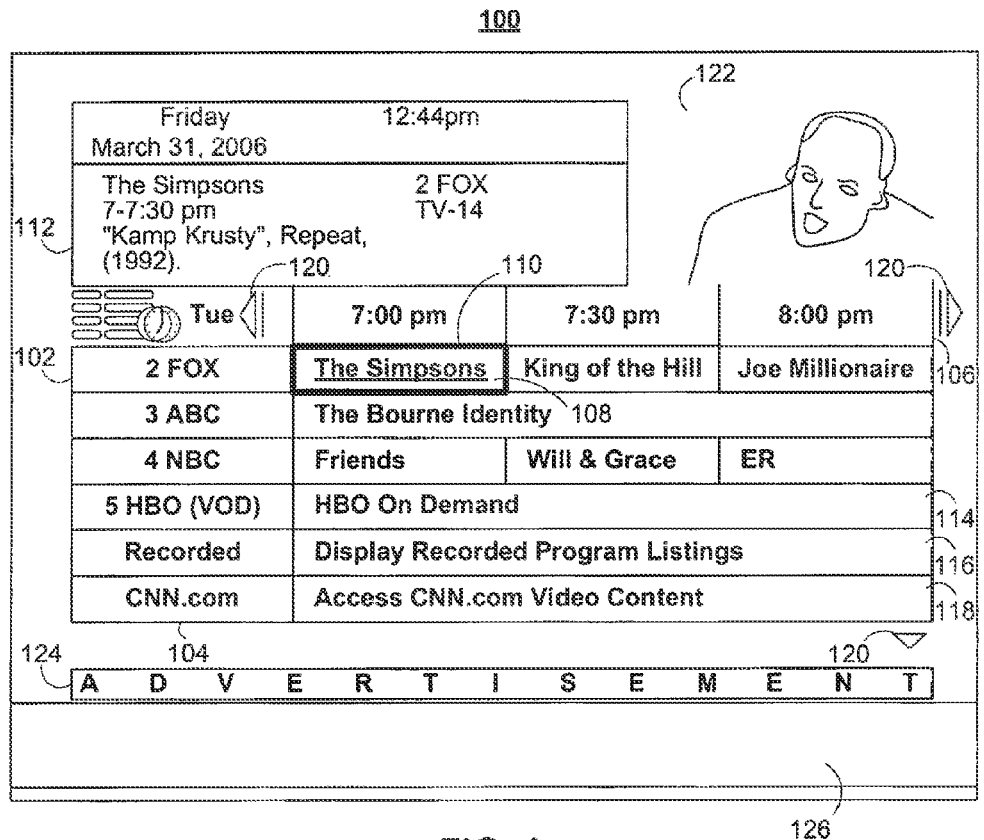
FIGS. 1 and 2 show illustrative display screens that may be used to provide media guidance application listings in accordance with one embodiment of the invention.

The amount of media available to users in any given media delivery system can be substantial. Consequently, many users desire a form of media guidance through an interface that allows users to efficiently navigate media selections and easily identify media that they may desire. An application which provides such guidance is referred to herein as an interactive media guidance application or, sometimes, a media guidance application or a guidance application.

Interactive media guidance applications may take various forms depending on the media for which they provide guidance. One typical type of media guidance application is an interactive television program guide. Interactive television program guides (sometimes referred to as electronic program guides) are well-known guidance applications that, among other things, allow users to navigate among and locate many types of media content including conventional television programming (provided via traditional broadcast, cable, satellite, Internet, or other means), as well as pay-per-view programs, on-demand programs (as in video-on-demand (VOD) systems), Internet content (e.g., streaming media, downloadable media, Webcasts, etc.), and other types of media or video content. Guidance applications also allow users to navigate among and locate content related to the video content including, for example, video clips, articles, advertisements, chat sessions, games, etc.

With the advent of the Internet, mobile computing, and high-speed wireless networks, users are accessing media on personal computers (PCs) and other devices on which they traditionally did not, such as hand-held computers, personal digital assistants (PDAs), mobile telephones, or other mobile devices. On these devices users are able to navigate among and locate the same media available through a television. Consequently, media guidance is necessary on these devices, as well. The guidance provided may be for media content available only through a television, for media content available only through one or more of these devices, or for media content available both through a television and one or more of these devices. The media guidance applications may be provided as on-line applications (i.e., provided on a website), or as stand-alone applications or clients on hand-held computers, PDAs, mobile telephones, or other mobile devices. The various devices and platforms that may implement media guidance applications are described in more detail below.

One of the functions of the media guidance application is to provide media listings and media information to users along with allowing users to record and watch saved programs. FIGS. 1-2 and 5-14 show illustrative display screens that may be used to provide media guidance, and in particular media listings and recording options. The display screens shown in FIGS. 1-2 and 5-14C may be implemented on any suitable device or platform. While the displays of FIGS. 1-2 and 5-14C are illustrated as full screen displays, they may also be fully or partially overlaid over media content being displayed. A user may indicate a desire to access media information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media information organized in one of several ways, such as by time and channel in a grid, by time, by channel, by media type, by category (e.g., movies, sports, news, children, or other categories of programming), recording priority, or other predefined, user-defined, or other organization criteria.

FIG. 1 shows illustrative grid program listings display 100 arranged by time and channel that also enables access to different types of media content in a single display. Display 100 may include grid 102 with: (1) a column of channel/media type identifiers 104, where each channel/media type identifier (which is a cell in the column) identifies a different channel or media type available; and (2) a row of time identifiers 106, where each time identifier (which is a ceil in the row) identifies a time block of programming. Grid 102 also includes cells of program listings, such as program listing 108, where each listing provides the title of the program provided on the listing's associated channel and time. Other information and indicators may also be included in grid cells, such as is described below in connection with FIG. 5 for example. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information whether the program is being recorded, whether there is a scheduling conflict, or any other desired information.

In addition to providing access to linear programming provided according to a schedule, the media guidance application also provides access to non-linear programming which is not provided according to a schedule. Non-linear programming may include content from different media sources including on-demand media content (e.g., VOD), Internet content (e.g., streaming media, downloadable media, etc.), locally stored media content (e.g., video content stored on a digital video recorder (DVR), digital video disc (DVD), video cassette, compact disc (CD), etc.), or other time-insensitive media content. On-demand content may include both movies and original media content provided by a particular media provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming media or downloadable media through an Internet web site or other Internet access (e.g. FTP). Non-linear programming content may also include digital images and text based information, digital music and other audio content.

Grid 102 may provide listings for non-linear programming including on-demand listing 114, recorded media listing 116, and Internet content listing 118. A display combining listings for content from different types of media sources is sometimes referred to as a "mixed-media" display. The various permutations of the types of listings that may be displayed that are different than display 100 may be based on user selection or guidance application definition (e.g., a display of only recorded and broadcast listings such as screen 1400 illustrated in FIG. 14A, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In other embodiments, listings for these media types may be included directly in grid 102. Additional listings may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the present invention.

Advertisement 124 may provide an advertisement for media content that, depending on a viewer's access rights (e.g., for subscription programming), is currently available for viewing, will be available for viewing in the future, or may never become available for viewing, and may correspond to or be unrelated to one or more of the media listings in grid 102. Advertisement 124 may also be for products or services related or unrelated to the media content displayed in grid 102. Advertisement 124 may be selectable and provide further information about media content, provide information about a product or a service, enable purchasing of media content, a product, or a service, provide media content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over media content or a guidance application display or embedded within a display. Advertisements may also include text, images, rotating images, video clips, or other types of media content.

Advertisements may be stored in the user equipment with the guidance application, in a database connected to the user equipment, in a remote location (including streaming media servers), or on other storage means or a combination of these locations. Providing advertisements in a media guidance application is discussed in greater detail in, for example, Knudson et al., U.S. patent application Ser. No. 10/347,673, filed Jan. 17, 2003, Ward, III et al. U.S. Pat. No. 6,756,997, issued Jun. 29, 2004, and Schein et al. U.S. Pat. No. 6,388,714, issued May 14, 2002, which are hereby incorporated by reference herein in their entireties. It will be appreciated that advertisements may be included in other media guidance application display screens of the present invention.

Options region 126 may allow the user to access different types of media content, media guidance application displays, and/or media guidance application features. Options region 126 may be part of display 100 (and other display screens of the present invention), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, modifying a recording priority of a program, setting program and/or channel as a favorite, purchasing a program, or other features. Options available from a main menu display may include search options, VOD options, parental control options, access to various types of listing displays, subscribe to a premium service, edit a user's profile, access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font sixe of text, etc.), aspects of media content listings displayed (e.g., only HDTV programming, user-specified broadcast channels based on favorite channel selections, re-ordering the display of channels, recommended media content, etc.), desired recording features (e.g., recording or series recordings for particular users, recording quality, recording priority of programs, recording and cropping options etc.), parental control settings, and other desired customizations.

The media guidance application may allow a user to provide user profile information or may automatically compile user profile information. The media guidance application may, for example, monitor the media the user accesses and/or other interactions the user may have with the guidance application. Additionally, the media guidance application may obtain all or part of other user profiles that are related to a particular user (e.g., from other web sites on the Internet the user accesses, such as www.tvguide.com, from other media guidance applications the user accesses, from other interactive applications the user accesses, from a handheld device of the user, etc.), and/or obtain information about the user from other sources that the media guidance application may access. As a result, a user can be provided with a unified guidance application experience across the user's different devices. This type of user experience is described in greater detail below in connection with FIG. 4. Additional personalized media guidance application features are described in greater detail in Ellis et al., U.S. patent application Ser. No. 11/179,410, filed Jul. 11, 2005, Boyer et al., U.S. patent application Ser. No. 09/437,304, filed Nov 9, 1099, and Ellis et al., U.S. patent application Ser. No. 10/105,128, filed Feb. 21, 2002, which, are hereby incorporated by reference herein in their entireties.

Figure 2:
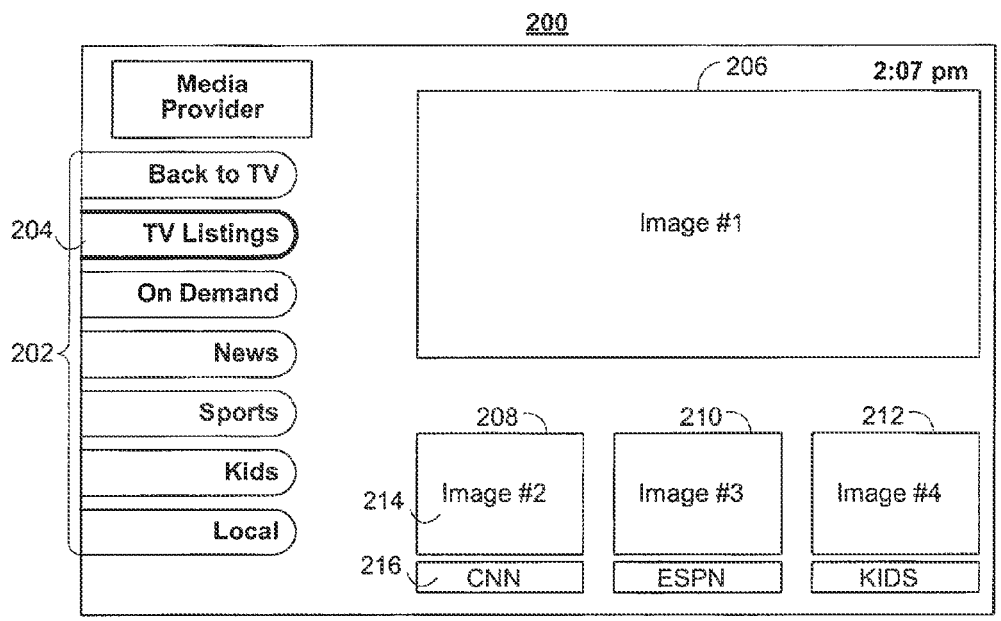

Another display arrangement for providing media guidance is shown in FIG. 2. Video mosaic display 200 includes selectable options 202 for media content information organized based on media type, genre, and/or other organization criteria. In display 200, television listings option 204 is selected, thus providing listings 206, 208, 210, and 212 as broadcast program listings. Unlike the listings from FIG. 1, the listings in display 200 are not limited to simple text (e.g., the program title) and icons to describe media. Rather, in display 200 the listings may provide graphical images including cover art, still images from the media content, video clip previews, live video from the media content, or other types of media that indicate to a user the media content being described by the listing. Each of the graphical listings may also be accompanied by text to provide further information about the media content associated with the listing. For example, listing 208 may include more than one portion, including media portion 214 and text portion 216, Media portion 214 and/or text portion 216 may be selectable to view video in full-screen or to view program listings related to the video displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the media provider or based on user preferences. Various systems and methods for graphically accentuating media listings are discussed in, for example, Yates, U.S. patent application Ser. No. 11/324,202, filed Dec. 29, 2005, which is hereby incorporated by reference herein in its entirety.

Figure 3:
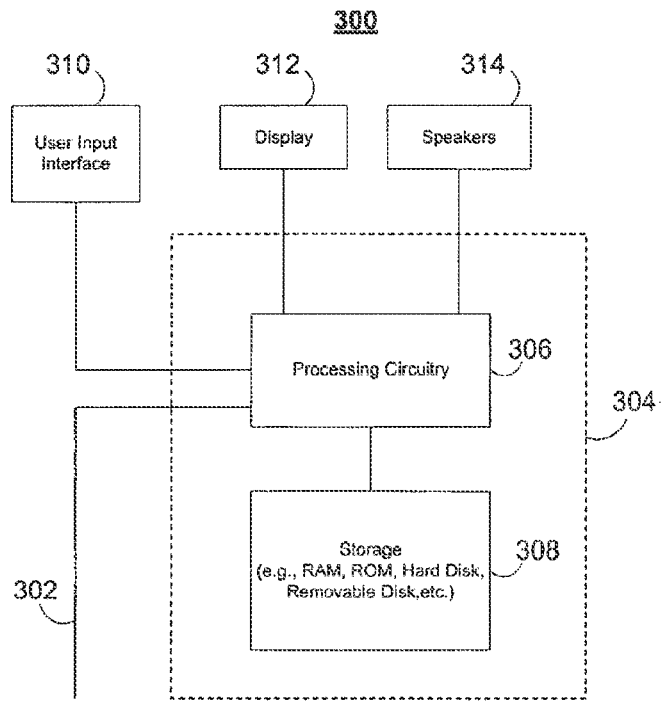
FIG. 3 shows an illustrative user equipment device in accordance with one embodiment of the invention.

Users may access media content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive media content and data via input/output (hereinafter "I/O") path 302. I/O path 302 may provide media content (e.g., broadcast programming, on-demand programming, Internet content, and other video or audio) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry 306 such as processing circuitry based on one or more microprocessors, microcontrollers, digital signal processors, programmable logic devices, etc. In some embodiments, control circuitry 304 executes instructions for a media guidance application stored in memory (i.e., storage 308). In client-server based embodiments, control circuitry 304 may include communications circuitry suitable for communicating with a guidance application server or other networks or servers. Communications circuitry may include a cable modem, an integrated services digital network (ISDN) modem, a digital subscriber line (DSL) modem, a telephone modem, or a wireless modem for communications with other equipment. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory (e.g., random-access memory, read-only memory, or any other suitable memory), hard drives, optical drives, or any other suitable fixed or removable storage devices (e.g., DVD recorder, CD recorder, video cassette recorder, or other suitable recording device) may be provided as storage 308 that is part of control circuitry 304. Storage 308 may include one or more of the above types of storage devices. For example, user equipment device 300 may include a hard drive for a DVR (sometimes called a personal video recorder, or PVR) and a DVD recorder as a secondary storage device. Storage 308 may be used to store various types of media described herein and guidance application data, including program information, guidance application settings, user preferences or profile information, or other data used in operating the guidance application. Non-volatile memory may also be used (e.g., to launch a boot-up routine and other instructions).

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scalar circuitry for upconverting and downconverting media into the preferred output format of the user equipment 300. Circuitry 304 may also include digital-to-analog converter circuitry and analog-to-digital converter circuitry for converting between digital and analog signals. The tuning and encoding circuitry may be used by the user equipment to receive and to display, to play, or to record media content. The tuning and encoding circuitry may also be used to receive guidance data. The circuitry described herein, including for example, the tuning, video generating, encoding, decoding, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may control the control circuitry 304 using user input interface 310. User input interface 310 may be any suitable user interface, such as a remote control, mouse, trackball, keypad, keyboard, touch screen, touch pad, stylus input, joystick, voice recognition interface, or other user input interfaces. Display 312 may be provided as a stand-alone device or integrated with other elements of user equipment device 300. Display 312 may be one or more of a monitor, a television, a liquid crystal display (LCD) for a mobile device, or any other suitable equipment for displaying visual images. In some embodiments, display 312 may be HDTV-capable. Speakers 314 may be provided as integrated with other elements of user equipment device 300 or may be stand-alone units. The audio component of videos and other media content displayed on display 312 may be played through speakers 314. In some embodiments, the audio may be distributed to a receiver (not shown), which processes and outputs the audio via speakers 314.

Figure 4:
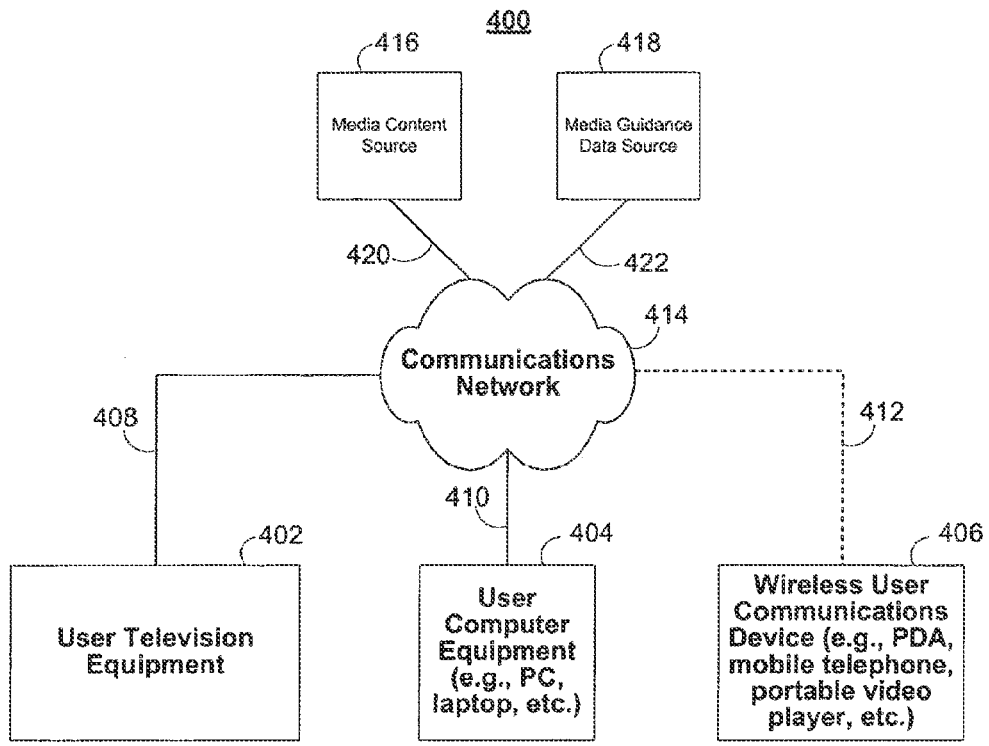
FIG. 4 is a diagram of an illustrative cross-platform interactive media system in accordance with one embodiment of the invention.

User equipment device 300 of FIG. 3 can be implemented in system 400 of FIG. 4 as user television equipment 402, user computer equipment 404, wireless user communications device 406, or any other type of user equipment suitable for accessing media, such as a non-portable gaming machine. For simplicity, these devices may be referred to herein collectively as user equipment or user equipment devices. User equipment devices, on which a media guidance application is implemented, may function as a stand-alone device or may be part of a network of devices. Various network configurations of devices may be implemented and are discussed in more detail below.

User television equipment 402 may include a set-top box, an integrated receiver decoder (IRD) for handling satellite television, a television set, a digital storage device, a DVD recorder, a video-cassette recorder (VCR), a local media server, or other user television equipment. One or more of these devices may be integrated to be a single device, if desired. User computer equipment 404 may include a PC, a laptop, a tablet, a WebTV box, a personal computer television (PC/TV), a PC media server, a PC media center, or other user computer equipment. WEBTV is a trademark owned by Microsoft Corp. Wireless user communications device 406 may include PDAs, a mobile telephone, a portable video player, a portable music player, a portable gaming machine, or other wireless devices.

It should be noted that with the advent of television tuner cards for PC's, WebTV, and the integration of video into other user equipment devices, the lines have become blurred when trying to classify a device as one of the above devices. In fact, each of user television equipment 402, user computer equipment 404, and wireless user communications device 406 may utilize at least some of the system features described above in connection with FIG. 3 and, as a result, include flexibility with respect to the type of media content available on the device. For example, user television equipment 402 may be Internet-enabled allowing for access to Internet content, while user computer equipment 404 may include a tuner allowing for access to television programming. The media guidance application may also have the same layout on the various different types of user equipment or may be tailored to the display capabilities of the user equipment. For example, on user computer equipment, the guidance application may be provided as a web site accessed by a web browser. In another example, the guidance application may be scaled down for wireless user communications devices.

In system 400, there is typically more than one of each type of user equipment device but only one of each is shown in FIG. 4 to avoid overcomplicating the drawing. In addition, each user may utilize more than one type of user equipment device (e.g., a user may have a television set and a computer) and also more than one of each type of user equipment device (e.g., a user may have a PDA and a mobile telephone and/or multiple television sets).

The user may also set various settings to maintain consistent media guidance application settings across in-home devices and remote devices. Settings include chose described herein, as well as channel and program favorites, programming preferences that the guidance application utilizes to make programming recommendations, display preferences, and other desirable guidance settings. For example, if a user sets a channel as a favorite on, for example, the web site www.tvguide.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile device (e.g., Blackberry) network, cable network, public switched telephone network, or other types of communications network or combinations of communications networks. BLACKBERRY is a service mark owned by Research In Motion Limited Corp. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment, devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes media content source 416 and media guidance data source 418 coupled to communications network 414 via communication paths 420 and 422, respectively. Paths 420 and 422 may include any of the communication paths described above in connection with paths 408, 410, and 412. Communications with the media content source 416 and media guidance data source 418 may be exchanged over one or more communications paths, but are shown as a single path in FIG. 4 to avoid overcomplicating the drawing. In addition, there may be more than one of each of media content source 416 and media guidance data source 418, but only one of each is shown in FIG. 4 to avoid overcomplicating the drawing. (The different types of each of these sources are discussed below.) If desired, media content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment, devices 402, 404, and 406 via communication paths (not shown) such as those described above in connection with paths 408, 410, and 412.

Media content source 416 may include one or more types of media distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other media content providers. NBC is a trademark owned by the National Broadcasting Company, Inc., ABC is a trademark owned by the ABC, INC., and HBO is a trademark owned by the Home Box Office, Inc. Media content source 416 may be the originator of media content (e.g., a television broadcaster, a Webcast provider, etc.) or may not be the originator of media content (e.g., an on-demand media content provider, an Internet provider of video content of broadcast programs for downloading, etc.). Media content source 416 may include cable sources, satellite providers, on-demand providers, Internet providers, or other providers of media content. Media content source 416 may also include a remote media server used to store different types of media content (including video content selected by a user), in a location remote from any of the user equipment devices. Systems and methods for remote storage of media content, and providing remotely scored media content to user equipment are discussed in greater detail in connection with Ellis et al., U.S. patent application Ser. No. 09/332,244, filed Jun. 11, 1999, which is hereby incorporated by reference herein in its entirety.

Media guidance data source 418 may provide media guidance data, such as media listings, media-related information (e.g., broadcast times, broadcast channels, media titles, media descriptions, ratings information (e.g., parental control ratings, critic's ratings, etc.), genre or category information, actor information, logo data for broadcasters' or providers' logos, etc.), media format (e.g., standard definition, high definition, etc.), advertisement information (e.g., text, images, media clips, etc.), on-demand information, and any other type of guidance data that is helpful for a user to navigate among and locate desired media selections.

Media guidance application data may be provided to the user equipment devices using any suitable approach. In some embodiments, the guidance application may be a stand-alone interactive television program guide that receives program guide data via a data feed (e.g., a continuous feed, trickle feed, or data in the vertical blanking interval of a channel). Program schedule data and other guidance data may be provided to the user equipment on a television channel sideband, in the vertical blanking interval of a television channel, using an in-band digital signal, using an out-of-band digital signal, or by any other suitable data transmission technique. Program schedule data and other guidance data may be provided to user equipment on multiple analog or digital television channels. Program schedule data and other guidance data may be provided to the user equipment, with any suitable frequency (e.g., continuously, daily, a user-specified period of time, a system-specified period of time, in response to a request from user equipment, etc.). In some approaches, guidance data from media guidance data source 418 may be provided to users' equipment using a client-server approach. For example, a guidance application client residing on the user's equipment may initiate sessions with source 418 to obtain guidance data when needed. Media guidance data source 418 may provide user equipment devices 402, 404, and 406 the media guidance application itself or software updates for the media guidance application.

Media guidance applications may be, for example, stand-alone applications implemented on user equipment devices, In other embodiments, media guidance applications may be client-server applications where only the client resides on the user equipment device. For example, media guidance applications may be implemented partially as a client application on control circuitry 304 (FIG. 3) of user equipment device 300 and partially on a remote server as a server application (e.g., media guidance data source 418). The guidance application displays may be generated by the media guidance data source 418 and transmitted to the user equipment devices. The media guidance data source 418 may also transmit data for storage on the user equipment, which then generates the guidance application displays based on instructions processed by control circuitry.

Media guidance system 400 is intended to illustrate a number of approaches, or network configurations, by which user equipment devices and sources of media content and guidance data may communicate with each other for the purpose of accessing media and providing media guidance. The present invention may be applied in any one or a subset of these approaches, or in a system employing other approaches for delivering media and providing media guidance. The following three approaches provide specific illustrations of the generalized example of FIG. 4.

In one approach, user equipment devices may communicate with each other within a home network. User equipment devices can communicate with each other directly via short-range point-to-point communication schemes describe above, via indirect paths through a hub or other similar device provided on a home network, or via communications network 414. Each of the multiple individuals in a single home may operate different user equipment devices on the home network. As a result, it may be desirable for various media guidance information or settings to be communicated between the different, user equipment devices. For example, it may be desirable for users to maintain consistent media guidance application settings on different user equipment devices within a home network, as described in greater detail in Ellis et al., U.S. patent application Ser. No. 11/179,410, filed Jul 11, 2005. Different types of user equipment devices in a home network may also communicate with each other to transmit media content. For example, a user may transmit media content, from user computer equipment to a portable video player or portable music player.

In a second approach, users may have multiple types of user equipment by which they access media content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. patent application Ser. No. 10/927,814, filed Aug. 26, 2004, which is hereby incorporated by reference herein in its entirety.

In a third approach, users of user equipment devices inside and outside a home can use their media guidance application to communicate directly with media content source 416 to access media content. Specifically, within a home, users of user television equipment 404 and user computer equipment 406 may access the media guidance application to navigate among and locate desirable media content. Users may also access the media guidance application outside of the home using wireless user communications devices 406 to navigate among and locate desirable media content.

It will be appreciated that while the discussion of media content has focused on video content, the principles of media guidance can be applied to other types of media content, such as music, images, etc.

Figure 5:
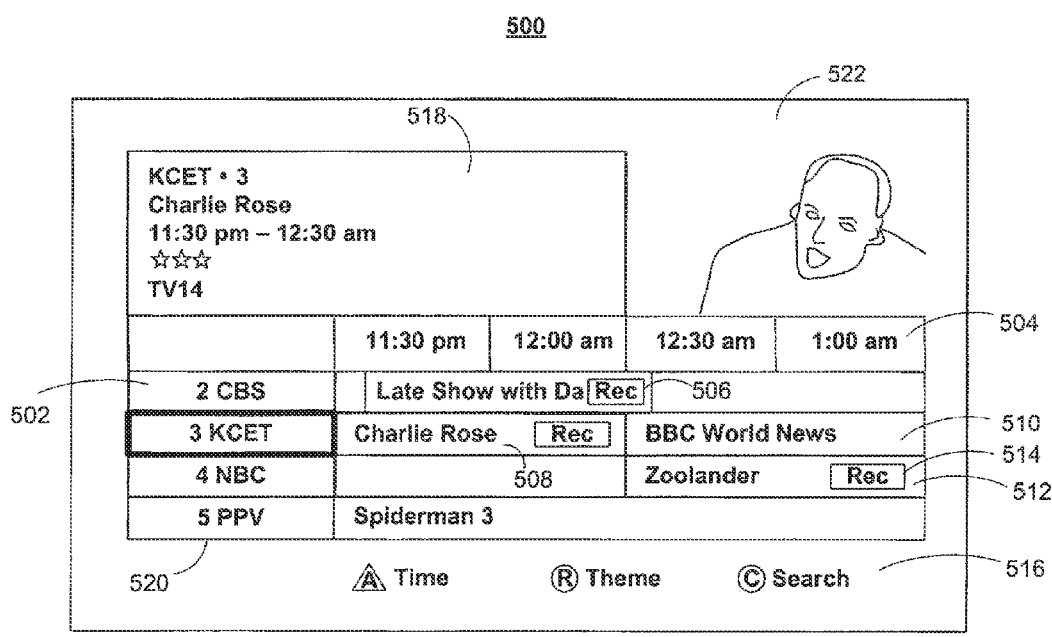
FIG. 5 shows an illustrative display screen that may be used to provide media guidance applications listings in accordance with one embodiment of the invention.
Figure 6:
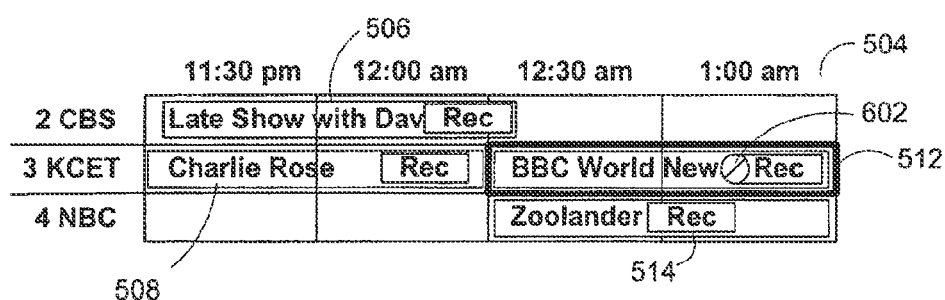
FIG. 6 shows a portion of the display screen of FIG. 5 that indicates a programming conflict in accordance with one embodiment of the invention.

FIGS. 5 and 6 show an illustrative program listing display arranged by time and channel that may be displayed on the display 312 of the user equipment device or media device 402, 404 or 406 (FIG. 4). In particular, FIG. 5 shows an illustrative program listing grid display 500 that includes a grid 520 with channel identifiers 502 and time identifiers 504, a media information region 518 and a video region 522 (sometimes referred to as a "picture-in-guide" or "PIG" region). The size, shape, layout and contents of the cells in the grid 520 of FIG. 5 may be similar to those of the grid 102 in FIG. 1. The grid 520 includes ceils of program listings, such as program listing 506 for the "Late Show with David Letterman" (referred to herein after as the "Late Show"), program listing 508 for "Charlie Rose", program listing 510 for "BBC World News" (referred to herein after as "News") and program listing 512 for "Zoolander." Late Show is a trademark owned by Worldwide Pants Inc., and BBC and BBC World are trademarks owned by the British Broadcasting Corporation. The cells 506, 508 and 512 include a recording icon 514 that indicates that the corresponding program is either currently being recorded or is scheduled for a future recording.

As noted earlier, the number of tuners or tuning circuitry in the control circuitry 304 (FIG. 3) in the user equipment device limits the number of programs that can be simultaneously recorded by the recorder 308. Most user equipment devices 402, 404 and 406 typically only have one or two tuners thereby restricting the number of programs that can be simultaneously recorded in their recorders 308 to one or two. In this example, the maximum number of concurrent recordings is two.

In the example of FIG. 5, Late Show 506 extends past 12:30 for a few minutes. Consequently, at 12:30 there are concurrent recordings scheduled Zoolander 512 and Late Show 506. When a user attempts to record News 510, the control circuitry 304 (FIG. 3) within the user equipment device modifies the grid portion 520 of display screen 500 of FIG. 5 to the screen shown in FIG. 6. As illustrated in FIG. 6, the News cell 510 is marked with a conflict icon 602. The control circuitry 304 (FIG. 3) may resolve the conflict as discussed in connection with FIGS. 7-10B. It should be noted that in other embodiments the conflicts may be resolved without user involvement such that icon 602 is not used.

As an initial matter the interactive media guidance application running on control circuitry 304 (FIG. 3) may determine whether cropping is appropriate. Since the overlap is small, the default approach for resolving the conflict is to allow Late Show 506 to be recorded till it ends and then start recording News 510, thereby cropping a portion of News 510. The user may be alerted to such a default option and given the option to modify existing recording and cropping settings.

Figure 7:
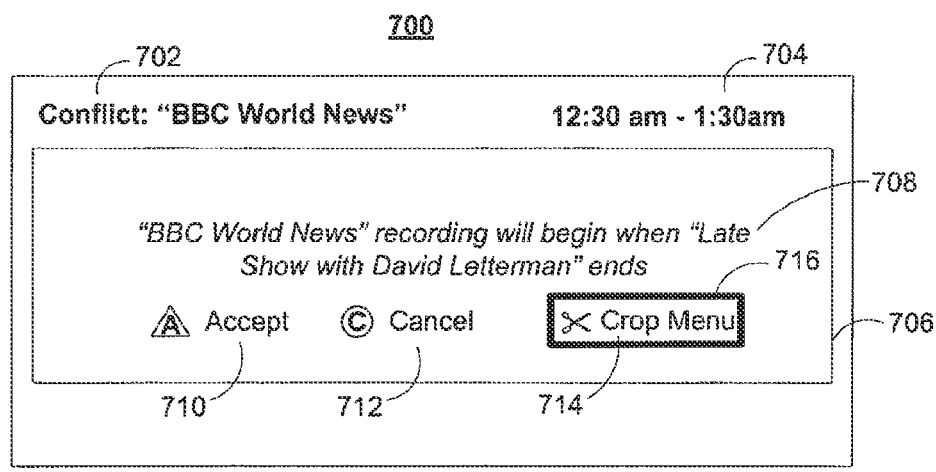
FIGS. 7-9B show illustrative displays for managing programming overlaps and conflicts in accordance with one embodiment of the invention.

FIG. 7 shows an illustrative display 700 that alerts the user, who is attempting to record News 510 (FIG. 5), that there is a conflict. In some embodiments, display 700 is overlaid onto a region on display screen 500 (FIG. 5). Text 702 indicates the existence of a conflict at a time shown in text 704. Text 708 informs the user that News 510 (FIG. 5) will be recorded once Late Show 506 (FIG. 5) has ended and a tuner is made available. The user is allowed to accept this option using accept button 710 or cancel recording using cancel button 712. In certain embodiments, the user is allowed to enter the cropping options menu using crop menu button 714. The user may use the navigation keys on the user equipment device or on a remote control associated with the user equipment device to move a highlight box 716 over the buttons 710, 712 and 714 to select a desired option.

Figure 8:
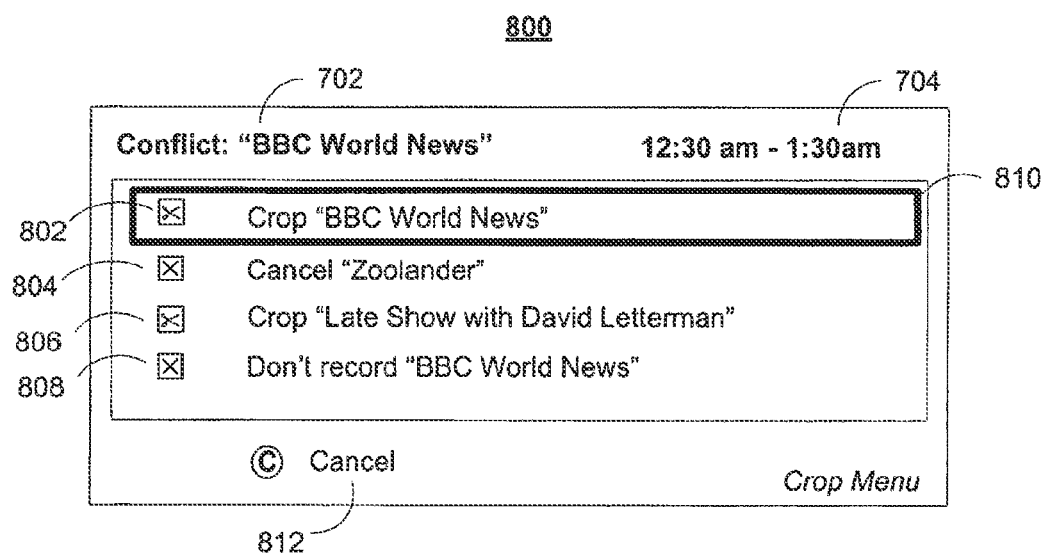

FIG. 8 shows an illustrative display 800 that provides a user with a set of choices to crop and/or cancel one or more programs scheduled for recording. In particular, the user is presented the option 802 of cropping News 530 (FIG. 5), option 804 of canceling Zoolander, option 806 of cropping Late Show 506 (FIG. 5), or option 808 of not recording News 510 (FIG. 5). Each of the options presented to the user allow for the scheduling conflict to be resolved. The user may use navigational keys to move the highlight box 810 and select an option. Alternatively, the user may select the cancel button 812 and exit from the display 800. The display 800 may be overlaid onto a region on display screen 500 (FIG. 5).

In the example of FIGS. 7 and 8, the user is attempting to schedule the recording of News prior to when it begins. When a user attempts to record a currently-running program, however, the interactive media guidance application may provide FIGS. 9A and 9B instead of FIGS. 7 and 8. Display 900 (FIG. 9A) includes text 902 that alerts the user to the fact that both tuners are currently busy and the requested recording is expected to run during time slot indicated by text 904. The user may select option 906 to immediately starting recording News 510 (FIG. 5), or option 908 to wait to start recording till Late Show 506 (FIG. 5) ends, or option 910 to not start recording News 510 (FIG. 5). The user may alternatively exit the display 900 by selecting the cancel button 914. If the user chooses option 908, then a starting portion of News 510 (FIG. 5) may be cropped to allow for Late Show 506 (FIG. 5) to be recorded in its entirety.

Figure 9A:
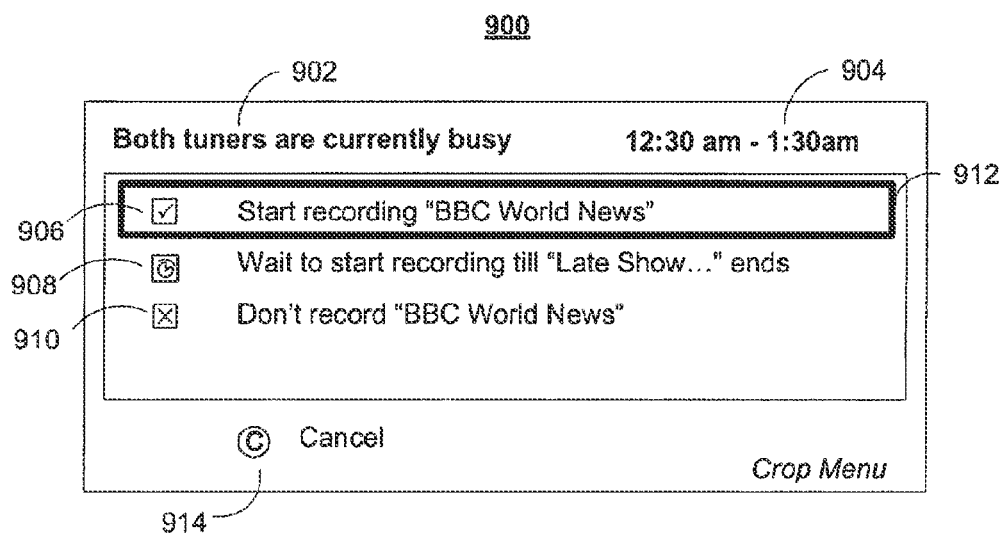
Figure 9B:
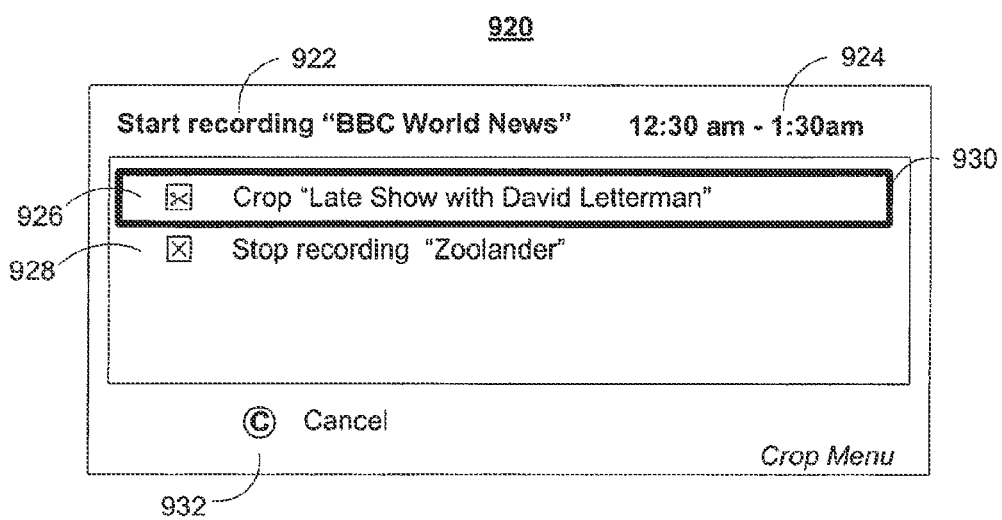

If the user chooses option 906, control circuitry 304 (FIG. 3) generates a display 920 shown in FIG. 9B. Display 920 identifies the user's choice of option 906 in text 922 for the time slot identified by text 924. As noted earlier, the user equipment device may be capable of recording two programs simultaneously. In such a case, if the user wants to start recording News 510 (FIG. 5) immediately, either the ending portion of Late Show 506 may have to be cropped or Zoolander 512 (FIG. 5) may have to be canceled. Screen 920 presents the user with option 926 for cropping Late Show 506 (FIG. 5) and option 928 for stopping Zoolander 512 (FIG. 5). In certain optional embodiments, the starting portion of Zoolander 512 (FIG. 5) may be cropped.

Figure 10A:
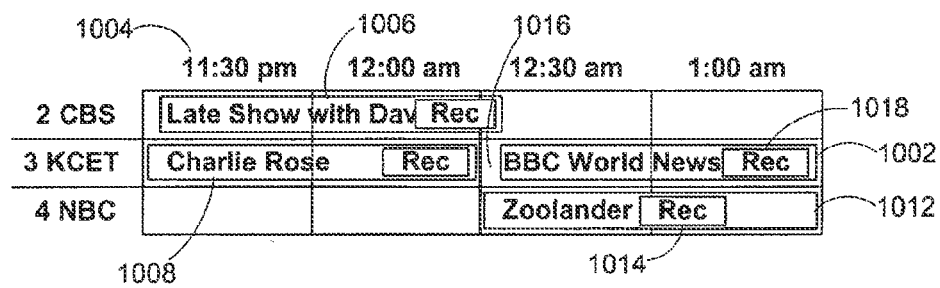
FIGS. 10A and 10B each shows a portion of the display screen of FIG. 5 that indicates the resolution of the programming conflict identified in FIG. 6 in accordance with one embodiment of the invention.
Figure 10B:
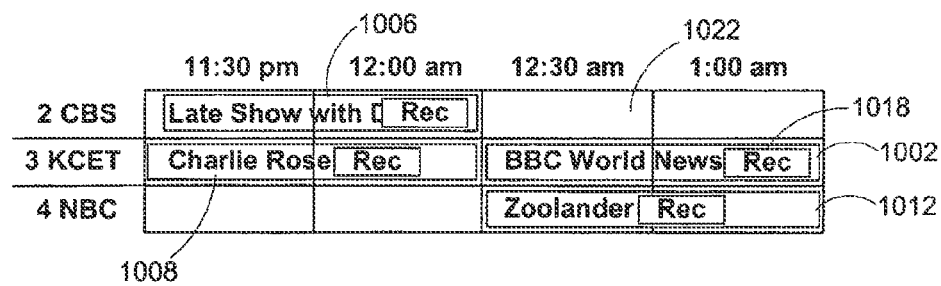

FIGS. 10A and 10B show the grid portion of the display screen 500 (FIG. 5) after a program has been cropped. In particular, in grid 1000 shown in FIG. 10A, Late Show 506 (FIG. 5) is illustrated as being recorded in its entirety while News 510 is cropped during a starting portion 1016, and recorded from a time starting at the end of Late Show. In the grid 1020 shown in FIG. 10B, the ending portion 1022 of Late Show is cropped and the News is recorded in its entirety. In certain alternative embodiments, the starting portion of Zoolander may be cropped such that both Late Show and News may be recorded in their entirety.

Figure 11A:
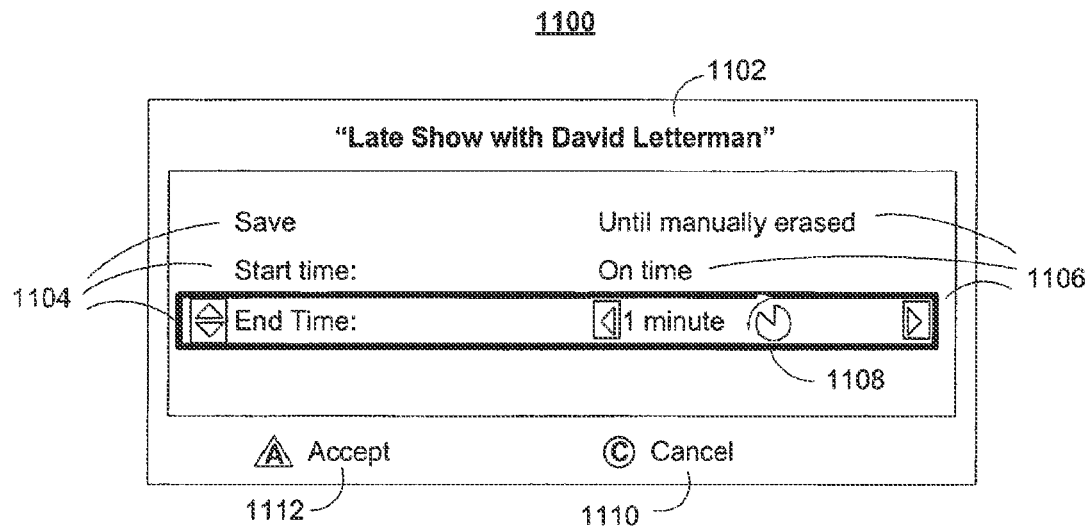
FIGS. 11A-C show illustrative displays that may be used to modify program attributes to manage programming overlaps and conflicts in accordance with one embodiment of the invention.
Figure 11B:
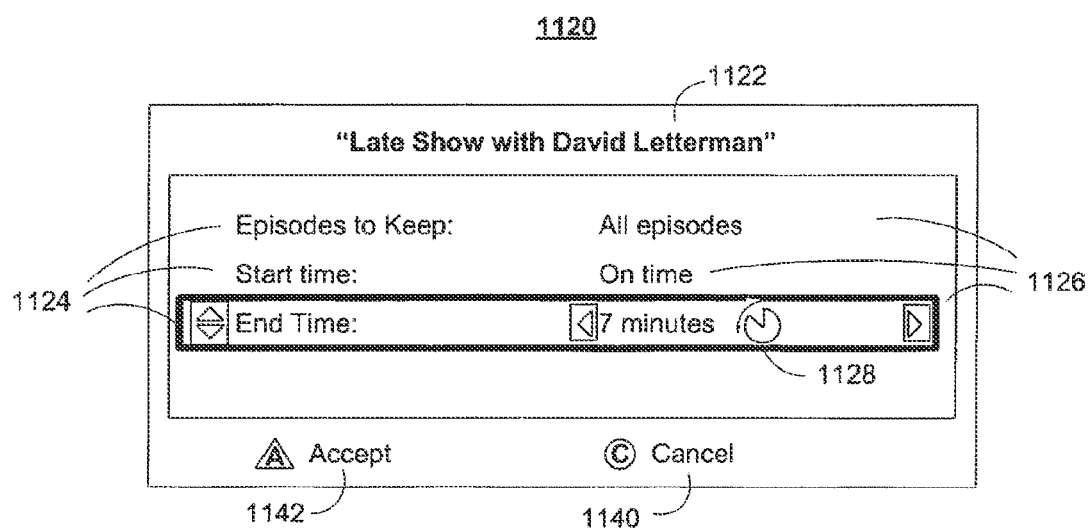
Figure 11C:
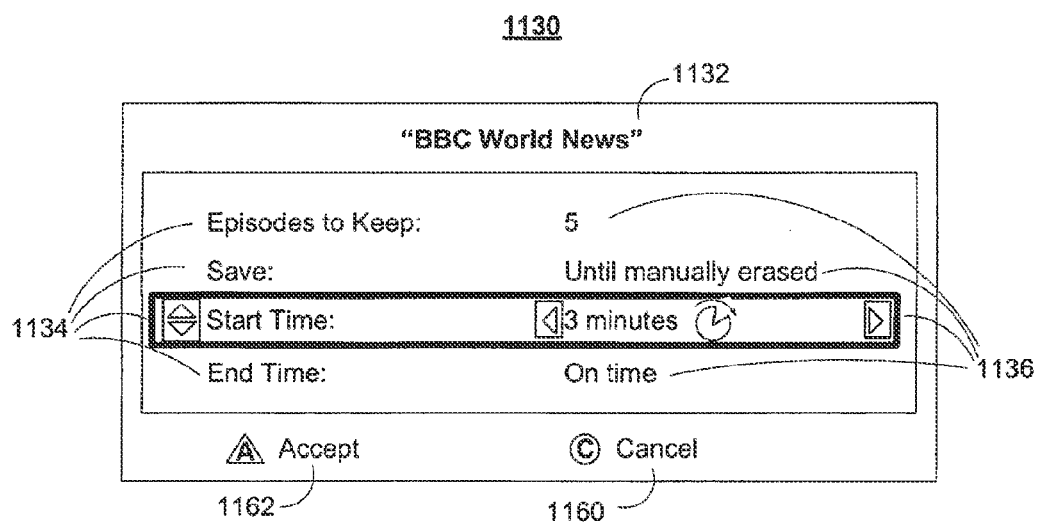

As discussed thus far, the user may have the option of cropping and/or canceling one or more scheduled recordings. In certain embodiments, the user may further have the option of more specifically modifying the extent of cropping so as to overcome scheduling conflicts. Turning back to FIG. 5, when a user selects a program for recording, and a scheduling conflict is identified, the user may optionally be allowed to manually modify recording options such that a scheduling conflict is overcome. FIGS. 11A-C depict illustrative displays 1100, 1120 and 1130, respectively that may be used to specify, among other things, the starting and ending times of a program to overcome scheduling conflicts.

Displays 1100, 1120 and 1130 include recording options and values associated with the options. Options 1104 and 1106 allow the user to set permissible beginning and ending crop times. That is, the user may specify how much time may be cropped automatically (how much time programs may overlap) without having to prompt the user and receive approval for cropping. These cropping times should not be confused with recording buffer times (not shown), where users may specify an amount of time to extend a recording from the normally scheduled start or end time. They should also not be confused with options (also not shown) which allow the user to adjust recording start and end times. In some embodiments such options, however, may he used in conjunction with cropping times.

FIG. 11A is an illustrative display 1100 for one-off recordings in which, for example, the user specifies that the recording may have 1 minute of its ending cropped. FIG. 11B is an illustrative display 1120 for series recordings in which, for example, the user specifies that the recording may have 7 minutes of its ending cropped. FIG. 11C is an illustrative display 1132 for a one-off recording in which, for example, the user specifies that recording may have 3 minutes of its beginning cropped.

Figure 12:
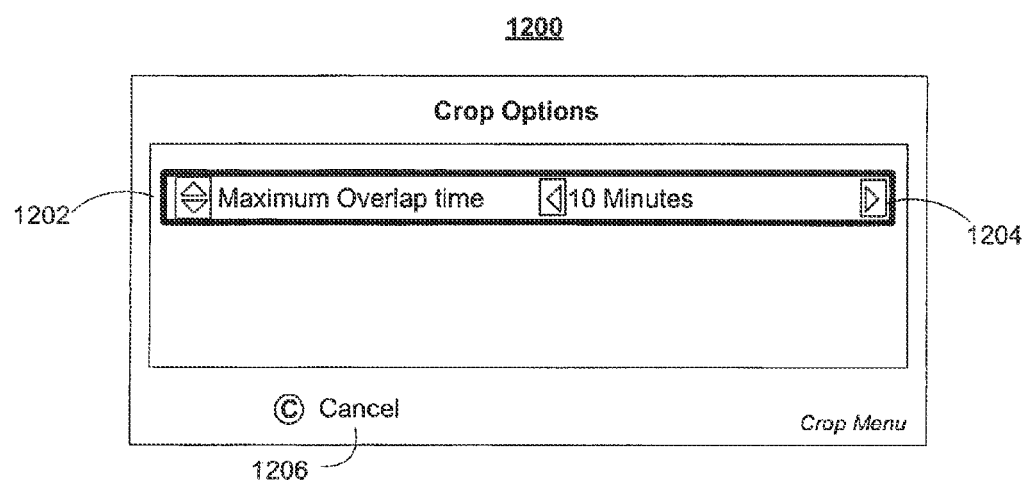
FIG. 12 shows an illustrative display that may be used to manage program cropping options in accordance with one embodiment of the invention.

In certain embodiments, cropping of one or more programs are needed only when there is an overlap that causes a scheduling conflict. However, if at least two programs overlap for a substantial portion of their respective air times, then it may be a waste of system resources to attempt to record only the small non-overlapping portions of these programs. In such cases, the control circuitry 304 (FIG. 3) may identify this conflict and determine the extent of overlap prior to cropping. If the control circuitry 304 (FIG. 3) determines that the overlap is less than a threshold amount of time (e.g. 10 minutes), then one or more programs may be cropped. If the overlap is greater than such a threshold, then the control circuitry 304 (FIG. 3) may cancel the recording of one or the other program. In some embodiments, the threshold is programmed into the interactive media guidance application. In other embodiments, the user may specify the threshold. FIG. 12 depicts a display 1200 for allowing a user to manually set such a threshold value. Display 1200 allows a user to adjust the Maximum overlap time 1202 to a time value 1204. The user may use the navigational keys on the user equipment device or a remote control for the same. The user may optionally exit from screen 1200 by selecting the cancel button 1206.

As noted earlier, in the event of a scheduling conflict, the control circuitry 304 (FIG. 3) may automatically determine which (if any) programs to crop and/or cancel. In certain embodiments, such a determination is made based on user-supplied recording priorities for the programs. Recording priorities may provide a measure of the importance of a particular program when compared to another.

Figure 13A:
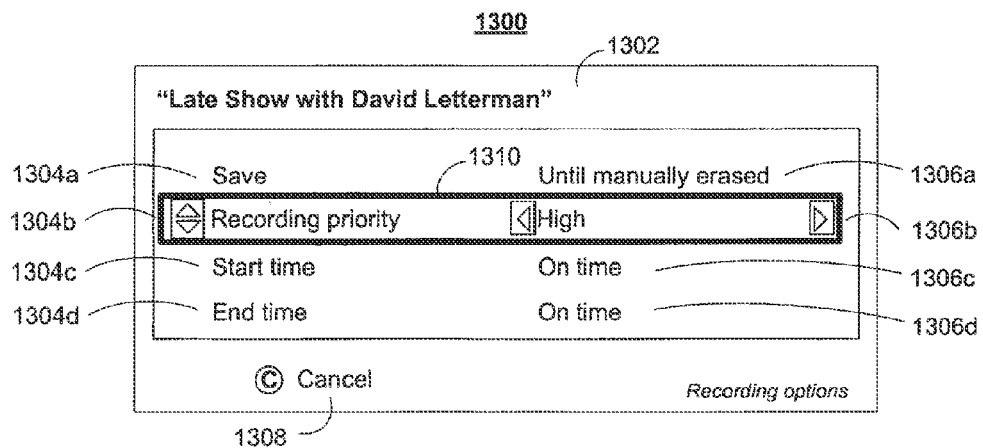
FIGS. 13A and 13B show illustrative displays that may be used to manage program attributes including recording priority in accordance with one embodiment of the invention.
Figure 13B:
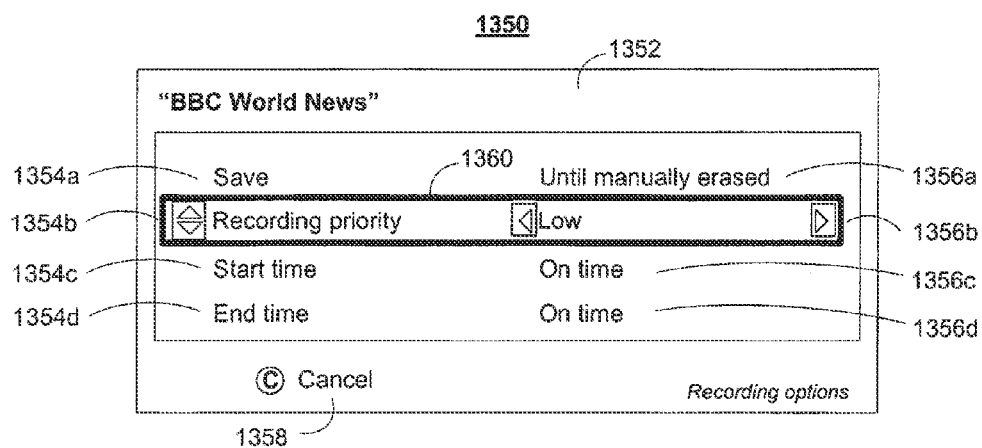

FIGS. 13A and 13B show illustrative displays 1300 and 1350, respectively, that allow a user to set various recording options for Late Show and News. Screens 1300 and 1350 may be similar to screens 1100, 1120 and 1130 of FIGS. 11A-C, but additionally including the option of modifying the recording priority 1304b and 1354b. More particularly, screen 1300 includes recording options 1304a-1304d with user adjustable values 1306a-1306d for the program identified in text 1302. Highlight 1310 may be used to highlight an option that is being modified. Similarly, screen 1350 includes recording options 1354a-1354d with user adjustable values 1356a-1356 for the program identified in text 1352. In the illustrated embodiments, the recording priority for Late Show is set to high while the recording priority for News is set to low. Such a setting allows the control circuitry 304 (FIG. 3) to make a preliminary determination for a choice of program to cropped and present the same to the user as shown previously in FIG. 7. Since News has a lower priority than Late Show, the control circuitry 304 (FIG. 3) proposes that News should begin when Late Show ends.

The recording priority of a program may also be determined by referring to a recording priority ranking list that ranks all or substantially all programs (or all series programs) to be recorded (e.g., most relevant with series recordings). For example, the recording priority ranking list may show, with #1 being of the highest priority:

1. Friends
2. Late Show
3. 24
4. BBC News
5. The Simpsons
6. Lost . . .

Such a ranking list containing a ranking of programs may be stored in storage 308. Accordingly, baaed on the list above, the Late Show has a higher recording priority than BBC News and trumps BBC News. So, when there is an scheduling conflict between the Late Show and BBC News whereby a portion of Late Show overlaps with BBC News, the control circuitry 304 may obtain the ranking list from storage 308 or from the user via user input interface 310 and determine based on the ranking list which program has a lower priority. In the above example, BBC News will be assigned the lower priority compared to Late Show. The scheduling conflict may be resolved by recording the program having a higher recording priority (i.e., Late Show) at least during the period of the overlap. The recording priorities of more than two programs may be determined similarly baaed on the recording priority ranking list and assigned according. If such a recording priority ranking list is already configured, the cropping of programs having overlap conflicts may be performed automatically based on the recording priority ranking list without any further user input.

Figure 14A:
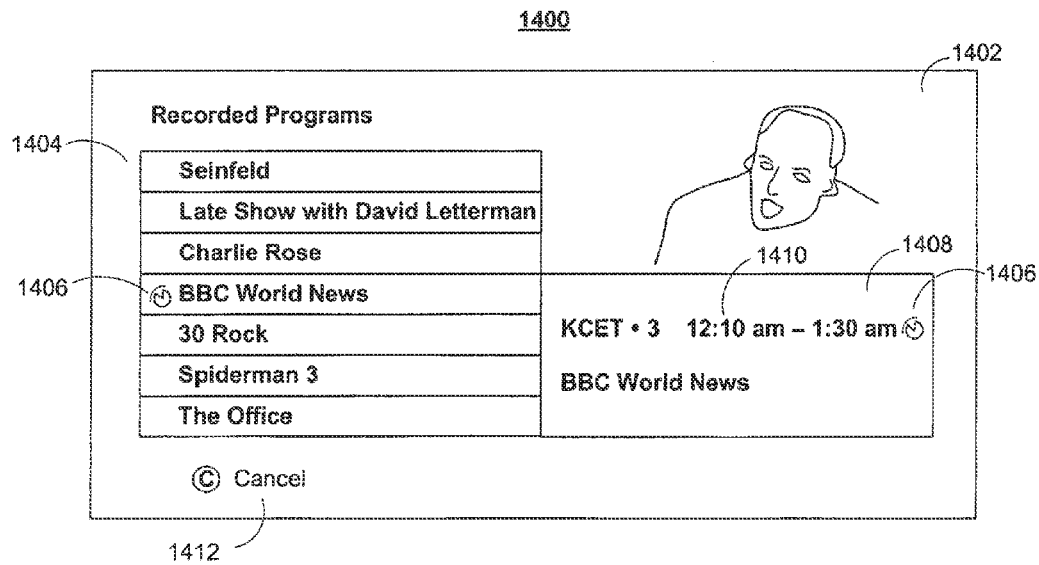
FIGS. 14A-14C show illustrative display screens for managing recorded programs in accordance with one embodiment of the invention.
Figure 14B:
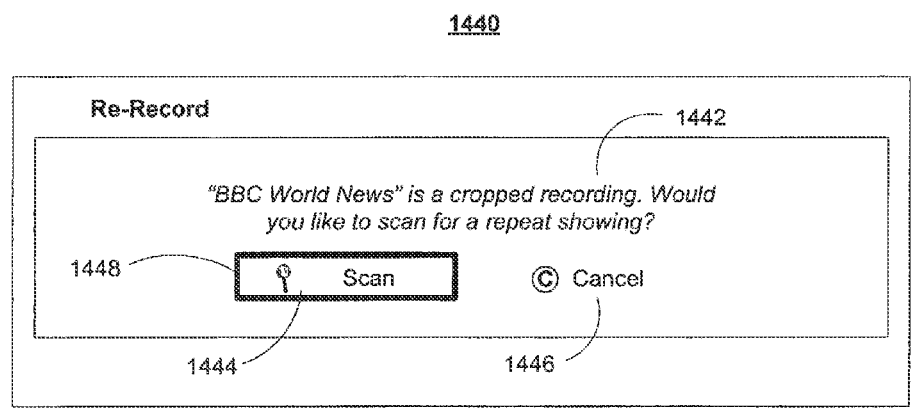
Figure 14C:
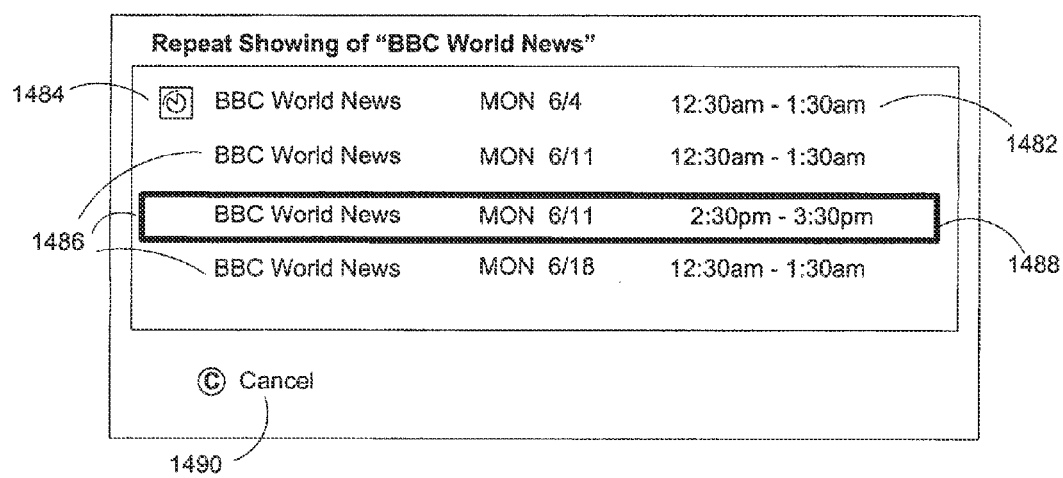

The recorded programs (cropped or full) are stored in storage 308 (FIG. 3) and may be retrieved for later viewing by the user. FIG. 14A depicts a display 1400 that provides a listing of the user's recorded programs. The display screen 1400 includes a list 1404, an information region 1408 and a video region 1402. The list 1404 shows a listing of each of the recorded programs including a cropping icon 1406 that indicates a recorded program that was cropped due to a scheduling conflict. In the illustrated embodiment, News was cropped and therefore includes a cropping icon 1406 in the list 1404. The information region 1408 typically provides more information about the recording including a channel identifier and program title and program information. If a program had been cropped, the information region 1408 may also indicate which portion of the program was cropped. The starting time 1410 of News is bolded and adjusted in the information region 1408 to indicate that cropping has occurred and the when the program was recorded. The information region may also include a the cropping icon 1406 to represent a cropped program.

In certain embodiments, the control circuitry 304 (FIG. 3) may prompt the user to record an un-cropped copy of a program. For example, in response to a user selecting a recording in display screen 1400, the control circuitry 304 (FIG. 3) may present display 1440 of FIG. 14B. Display 1440 alerts the user that News is a cropped recording via text 1442 and prompts the user to indicate whether the user would like the control circuitry 304 (FIG. 3) to search for repeats of News by highlighting 1448 and selecting the scan button 1444. Optionally, the user may elect to close the screen by selecting the cancel button 1446. On selecting the scan option 1444, the control circuitry 304 (FIG. 3) searches the guidance data stored in storage 303 (FIG. 3) and presents the user with display 1480 shown in FIG. 14C. Screen 1480 includes a listing 1482 of repeat showings 1486 of News at various times. The user may select one or more of the repeat showings of News using the highlight box 1488 and schedule a recording for the desired time.

Figure 15:
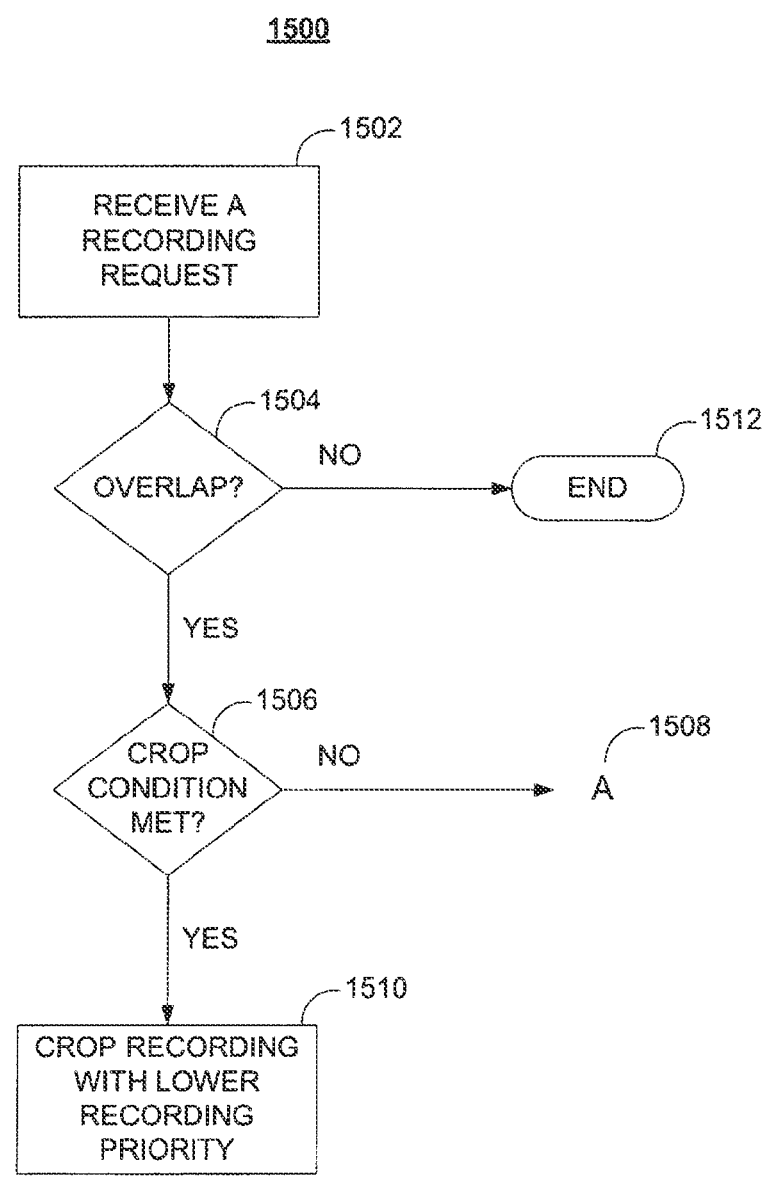
FIGS. 15-19 are illustrative process flowcharts of steps involved in managing overlapping or conflicting recordings according to various embodiments of the invention.

FIGS. 15-19 are illustrative process flow charts of steps involved in managing overlapping or conflicting recordings. In particular, FIG. 15 depicts a process 1500 for cropping a program beginning with receiving a recording request (step 1502). A user may provide a recording request by selecting a program on display screen 100 or 500 by using navigation keys on the user equipment device or a remote control and then pushing a record button on the device or remote control. The navigation keys and the record button are typically part of the user input interface 310 (FIG. 3) that transmits the request from the user to the control circuitry 304 (FIG. 3). The control circuitry 304 (FIG. 3) receives the recording request which may be a request for recording a particular program such as News 510. The control circuitry 304 (FIG. 3) determines if the requested program overlaps with any other program (step 1504). The storage/memory 308 (FIG. 3) such as a hard disk may have saved listing of programs to be aired that may have been obtained from a media guidance data source 418 (FIG. 4). The memory 308 (FIG. 3) may additionally have information about programs that have already been scheduled for recording. The control circuitry 304 (FIG. 3) compares the air time of the requested recording with air times of other programs already scheduled for recording to determine if there are any overlapping portions. If there are no overlaps, the process 1500 ends (step 1512) and the requested program is scheduled for recording.

In the event of an overlap, the control circuitry 304 (FIG. 3) determines if one or more crop conditions have been met (step 1506). In certain embodiments, the crop conditions include, among other things, an overlap time. In such embodiments, if the overlap time is less than a certain threshold then the crop condition is said to have been met and the program having a lower recording priority is cropped (step 1510). The crop condition may be set by a user using the display 1200 (FIG. 12) in the interactive guidance application. However, if the overlap time is larger than the threshold, then the crop condition is not met and there is an unresolved conflict (step 1508). The unresolved conflict arises because an overlapping conflict has been identified by the control circuitry 304 (FIG. 3). However, since the crop condition was not met, the overlapping conflict was not resolved.

Figure 16:
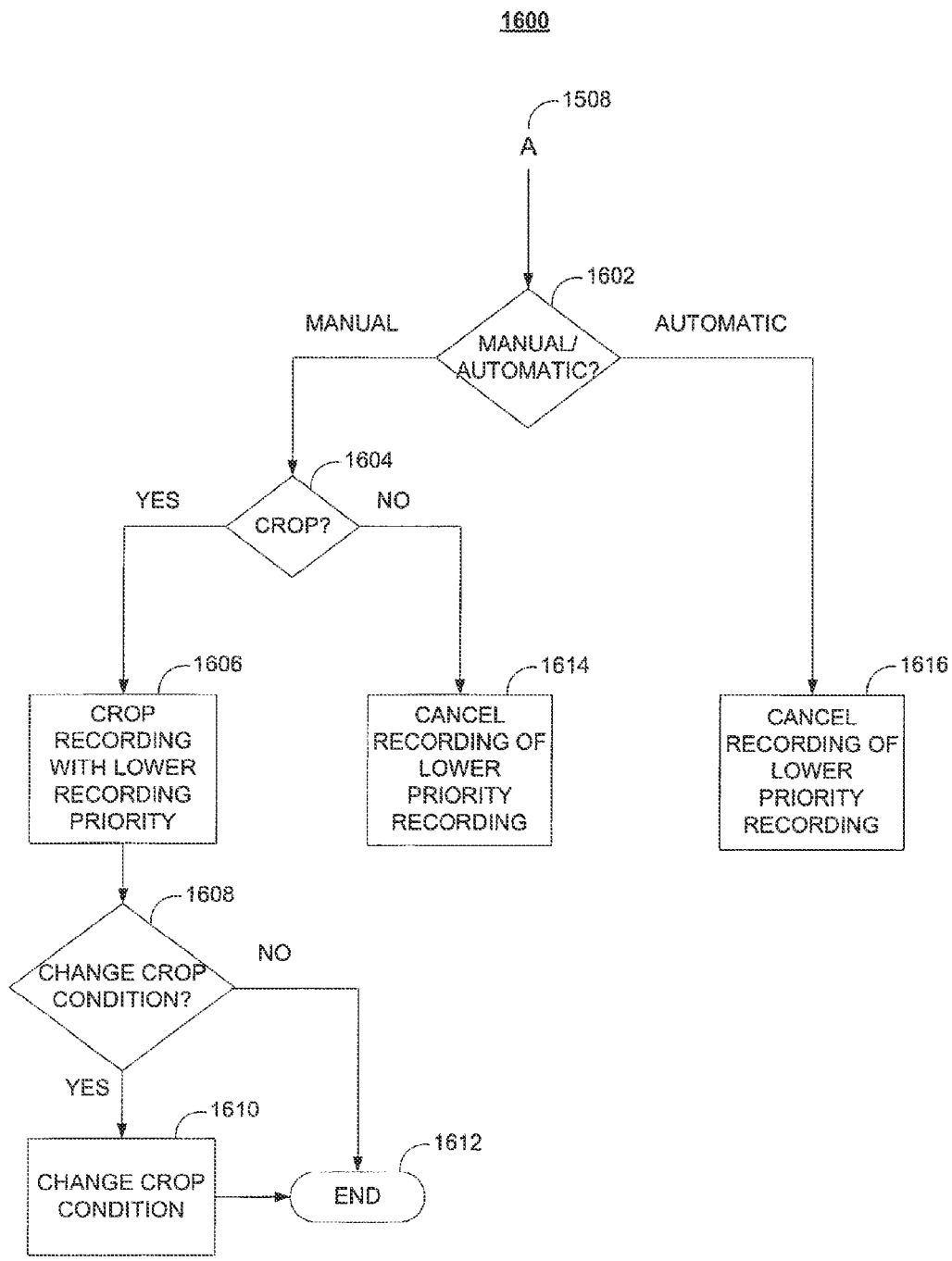

FIG. 16 depicts a process 1600 for resolving the aforementioned unresolved conflicts arising from overlapping conflicts that have not met crop conditions. Typically, such unresolved conflicts arise when two or more programs have an overlap that is a substantially large portion of their air time. The control circuitry 304 (FIG. 3) may provide the user with the option of resolving the conflict either manually by the user or automatically by the control circuitry 304 (FIG. 3) (step 1602). If the user opts for an automatic resolution of the conflict, the control circuitry 304 (FIG. 3) determines which of the programs has a lower priority and cancels the recording of that program (step 1616). The recording priority of a program may be set using the recording option displays 1300 and 1350 shown in FIGS. 13A and 13B.

If the user chooses to resolve the conflict manually, then the user is provided the option of either cropping or canceling one or more programs (step 1604). If the user opts to cancel a recording, the processing circuitry cancels the recording of the program having a lower recording priority. If the user instead chooses to crop a recording, the control circuitry 304 (FIG. 3) crops the program having a lower recording priority.

In certain embodiments, the crop condition may have been a maximum threshold for overlap time and the crop condition may not have been met because the overlap exceeded this threshold by a small amount. A user may be able to recognize this and simply crop a low priority recording instead of completely canceling it. The user may also be given the option of changing the crop condition (e.g. change the maximum threshold for overlap) (step 1608). The user may change the crop condition such as overlap time to increase the maximum threshold for overlap to increase the chance that crop conditions may be met more often in future recordings.

Figure 17A:
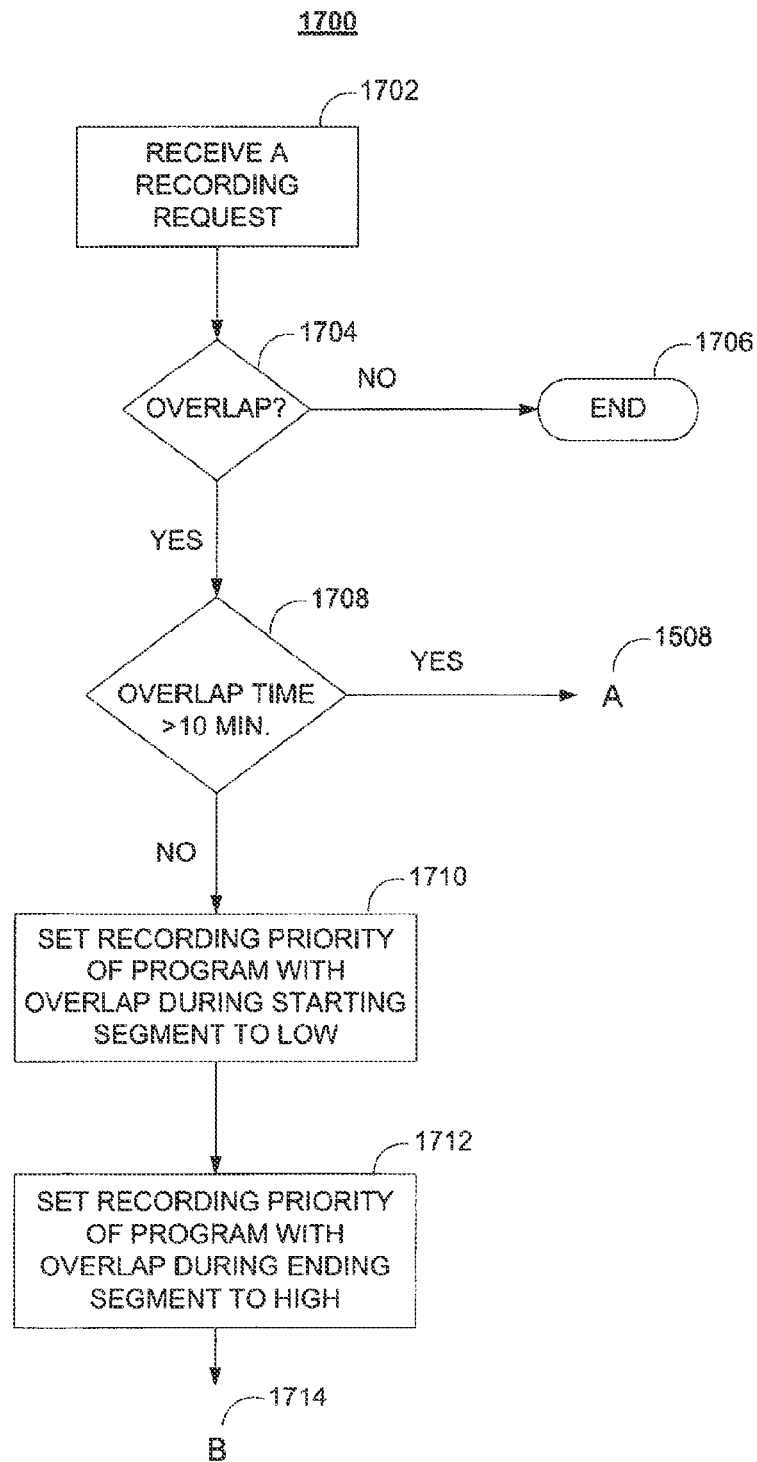

FIG. 17A, more specifically, depicts a process 1700 for managing scheduling conflicts arising from scheduling overlapping programs for recording. The process 1700 begins when the control circuitry 304 (FIG. 3) receives a recording request (step 1702). The recording request may be received from user via user input interface 310 or internally from the control circuitry 304 (FIG. 3) whereby based on certain aspects of the user's viewing habits, the control circuitry 306 may suggest a program for recording. The control circuitry 304 (FIG. 3) determines if the program requested to be recorded overlaps with another program already scheduled for recording (step 1704). As noted earlier, the control circuitry 304 (FIG. 3) interacts with the storage 308 to compare stored program schedules and time Information determine if such an overlap exists. If the control circuitry 304 (FIG. 3) determines that there is no overlap, then the process 1700 is ended (step 1706) and the program may be recorded.

However, if the control circuitry 304 (FIG. 3) identifies an overlap, it determines if the overlap time of the two programs is less than maximum overlap time of 10 minutes. The maximum overlap time may be user customizable via display 1200 shown in FIG. 12. If the overlap is greater than the maximum overlap time, then an unresolved conflict has occurred and has to be resolved using process 1600 shown in FIG. 16.

If the overlap time is less than the maximum overlap time of 10 minutes, the control circuitry including the control circuitry 304 (FIG. 3) in conjunction with the storage 308 (FIG. 3) sets the recording priority of the program with the overlap during a starting segment to low (step 1710). The control circuitry 304 (FIG. 3) also sets the priority of the program with the overlap during an ending segment to high (step 1712). Additionally and optionally, a user may be able to modify the recording priority of each of the overlapping programs using the recording options screens 1300 and 1350 shown in FIGS. 13A and 13B. Once the overlapping programs that are scheduled for recording have been assigned recording priorities, the control circuitry 304 (FIG. 3) turns to recording the programs based on these priorities (step 1714).

Figure 17B:
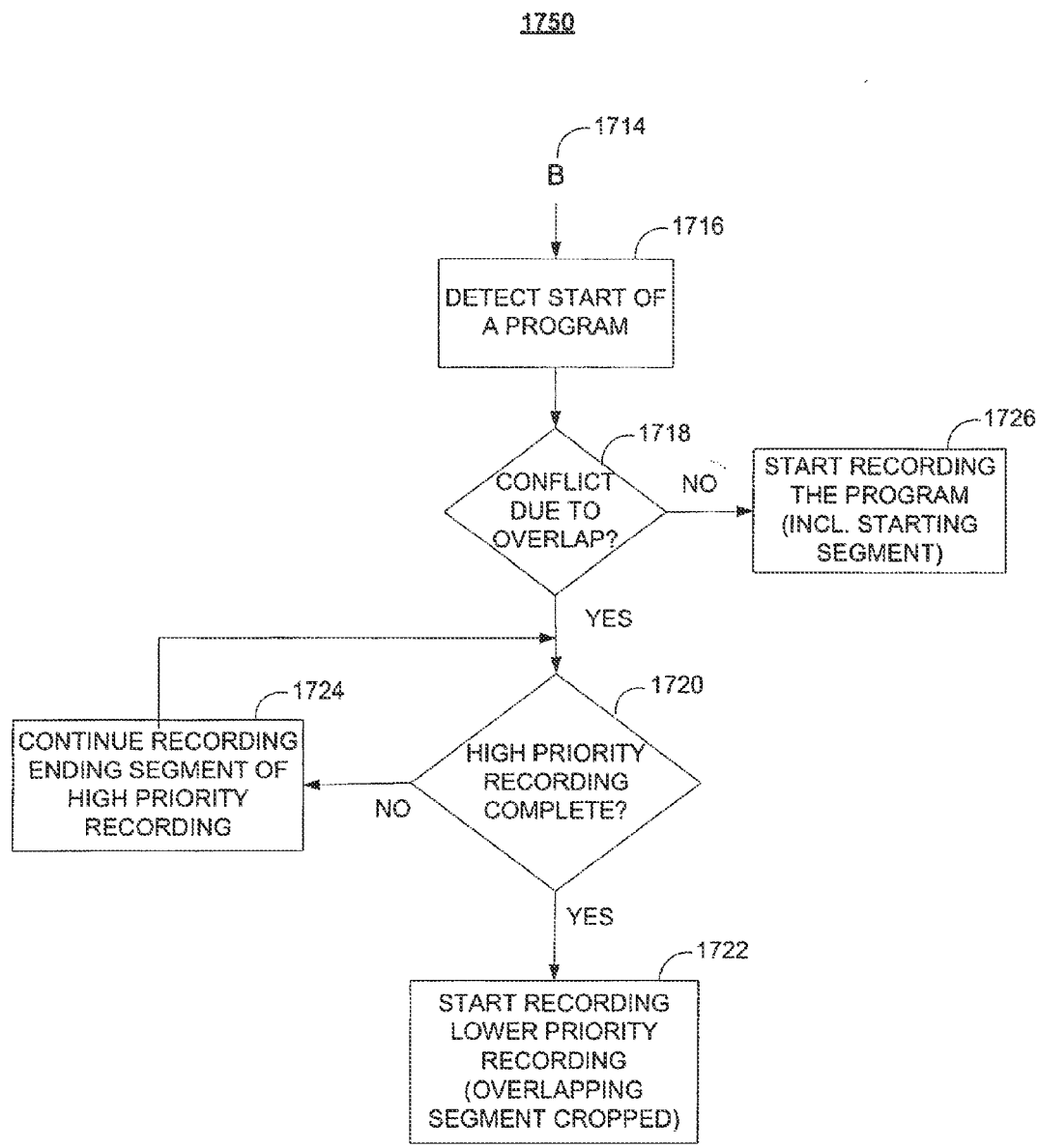

In particular, as depicted in process 1750 of FIG. 17B, the control circuitry detects the start of the low priority program, scheduled for recording, obtained from the media content source 416 via communication path 302 (FIG. 3) (step 1716). The control circuitry 304 (FIG. 3) checks to see if there are any tuners available for recording the program at the start time (step 1718). If there is at least one tuner available, the control circuitry 304 (FIG. 3) tunes the tuner to the channel in which the program is being aired and directs the recorder 308 to start recording the program from the beginning (step 1726).

If, however, there is no tuner available at the start of the program (i.e. if the tuners are currently busy and tuned to other channels for recording other higher priority programs), the control circuitry 304 (FIG. 3) determines whether one of the higher priority recordings are complete (step 1720). If the high priority recording has not yet ended, then the control circuitry 304 (FIG. 3) allows this program to end and checks again closer to the end (steps 1720 and 1724).

Once the high priority program has ended, the control circuitry 304 (FIG. 3) directs the tuner to tune to the low priority program, and the recorder to start recording the low priority program (step 1722). Since the control circuitry 304 (FIG. 3) waited until the end of the high priority program to begin recording the low priority program, a portion of the starting segment of the low priority program may be cropped to overcome the scheduling conflict.

Figure 18:
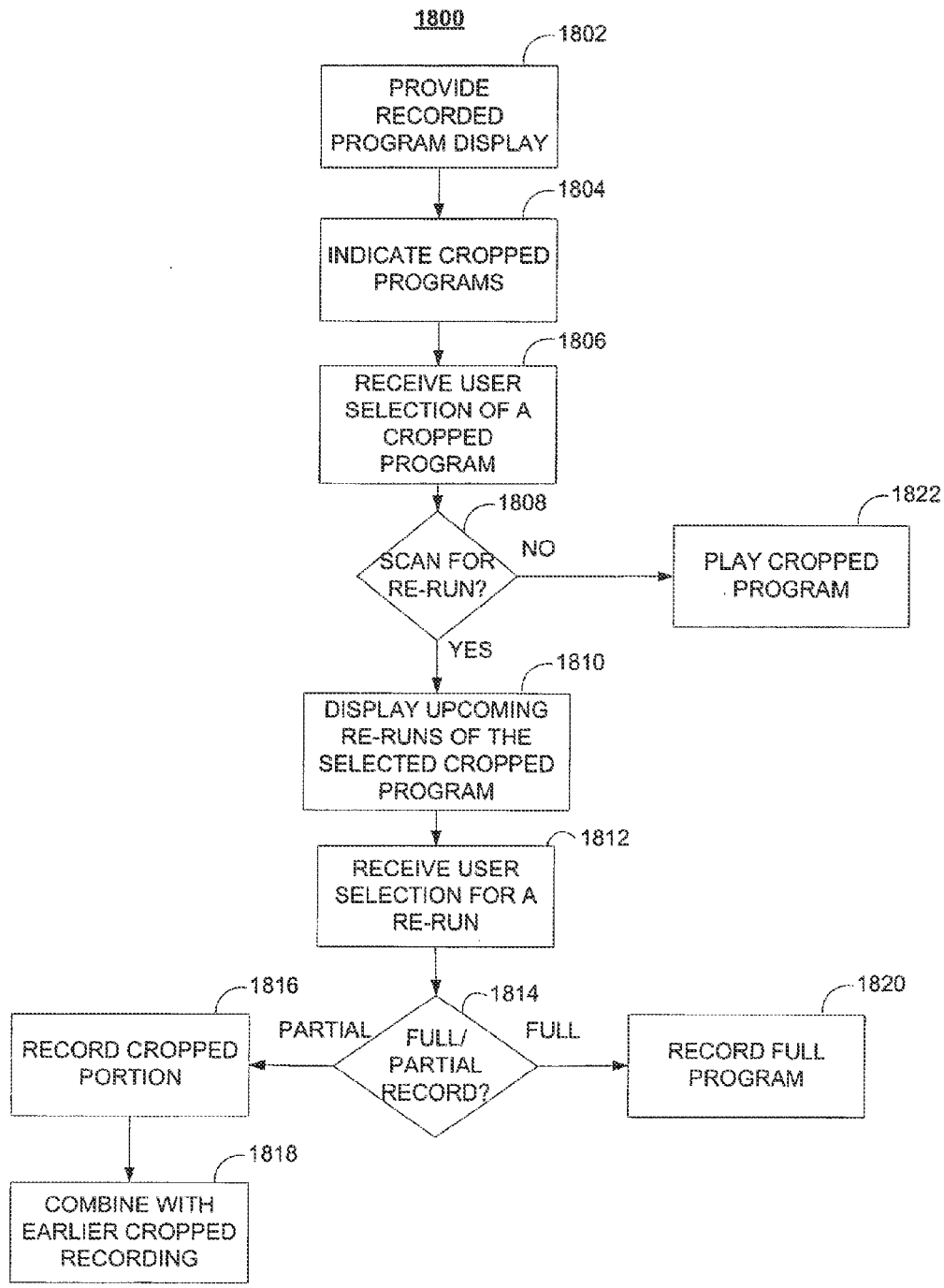

As noted earlier, recorded programs including those that have been cropped are stored in memory/storage 308 (FIG. 3) for later viewing. A user wishing to watch cropped portions of the cropped recordings may choose to re-record the program in its entirety or at least the cropped portion. FIG. 18 depicts a process 1800 for re-recording at least portions of cropped programs. The user may be provided with a recorded program display similar to display screen 1400 (FIG. 14) shown in FIG. 14A (step 1802). The display screen 1400 (FIG. 14) may be generated by the control circuitry 304 (FIG. 3) by first querying the recorder and memory 308 (FIG. 3) for a location of each of the programs that have been previously recorded. The control circuitry 304 (FIG. 3) generates a listing of such programs and determines based on one or more attributes of the recording whether the program was cropped. The control circuitry 304 (FIG. 3) flags cropped programs with cropping icons similar to cropping icons 1406 (FIG. 14) in display screen 1400 (FIG. 14) (step 1804).

Using display screen 1400 (FIG. 14), the user may browse the recorded program listings and select a program to view or re-record. If the user selects a program that is not cropped, then the user may be allowed to view the program. However, if the user selects a cropped program, the user may be allowed to either view the cropped program or search for repeat showings of the cropped program so that at least the cropped portion may be re-recorded.

If the user selects a cropped program such as News on screen 1400 (FIG. 14), the control circuitry 304 (FIG. 3) receives this request (step 1806) and displays a dialog screen that allows the user to play the cropped program or scan (e.g., screen 1440, FIG. 14B) for repeat showings of the program (step 1808). If the user opts to play the cropped program, then the control circuitry 304 (FIG. 3) obtains the program from storage 308 and plays it on display 312 (FIG. 3) (step 1822).

If the user opts to scan for a repeat showing of the program, the control circuitry 304 (FIG. 3) queries the media guidance data source 418 (FIG. 4) for a schedule of upcoming repeat showings of the program. On receiving such a listing from the media guidance source 418 (FIG. 4), the processing circuitry generates a display screen, similar to display 1480 (FIG. 14), listing upcoming repeat airings of the program (step 1810). The user may select a repeat version of the program (e.g., repeats 1486, FIG. 14C) that may air at another time and/or on another day. The control circuitry 304 (FIG. 3) receives a user selection for a re-run (step 1812) that it attempts to schedule for recording. The user is then allowed to select between either recording the program in its entirety or simply re-recording the previously cropped portion. If the user selects to re-record the entire program, the processing circuitry schedules such a recording, pending any further overlapping conflict checks (step 1820). Any new overlapping conflicts may be handled similarly to the processes described herein. The user may have the option of recording a full repeat only when there is no conflict. The user may also have the option of setting the recording priority of the repeat showing different from the original cropped recording. For example, if flews was set to a low recording priority (screen 135, FIG. 13B), then a repeat showing of News (listing 1486, FIG. 14C) may be set to a high priority to ensure that the program is recorded in full.

In certain embodiments, the user may elect to simply record the cropped portion of the cropped program. As an example, the user may wish to only record the beginning segment of News 510 (FIG. 5) that was overlapping the ending segment of Late Show 506 (FIG. 5). In such embodiments, the control circuitry 304 (FIG. 3) compares the start and end time of the program to the start and end time of the cropped recording to determine which portions of the program was cropped. The control circuitry 304 (FIG. 3) directs the recorder 308 to record the repeat showing of the program during the time that the previous recording was cropped (step 1816). In certain embodiments, the control circuitry 304 (FIG. 3) may combine the re-recorded cropped portion of the program with the previous cropped recording to provide the user with a complete version of the program (e.g., "stitching" of the program).

Figure 19:
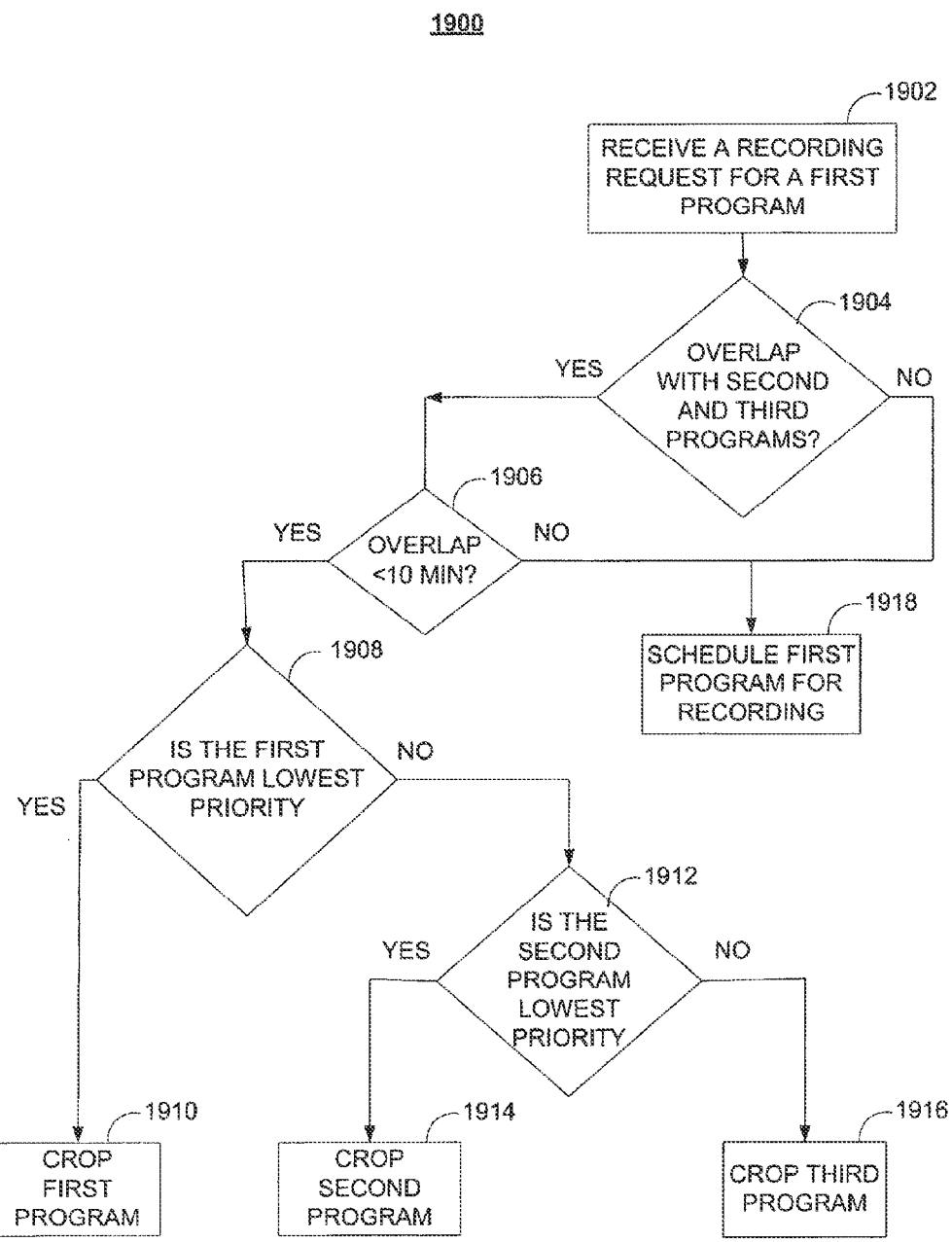

As noted earlier, the user equipment devices may be configured with two tuners that may allow about two programs to be recorded simultaneously. FIG. 19 depicts a process 1900 for managing a plurality of overlapping recordings. In particular, process 1900 manages scheduling conflicts between three overlapping programs. The process begins when the processing circuitry receives a request for recording a first program, either from a user or from an agent internal to the control circuitry 304 (FIG. 3) (step 1902). The control circuitry 304 (FIG. 3) determines if the first program overlaps with second and third programs (step 1904). As noted earlier, the processing circuitry obtains media information from the media guidance data source 418 (FIG. 4) and determines based on the information stored in the storage 308 (FIG. 3) whether the first program overlaps with other programs. If it is determined that the first program does not overlap with the second and third programs, then the control circuitry 304 (FIG. 3) schedules the first program for recording (step 1918).

In certain embodiments, if the control circuitry 304 (FIG. 3) determines that the first program overlaps with a second and third program, then the control circuitry 304 (FIG. 3) attempts to determine the overlap time (step 1906). If the overlap time is greater than a maximum overlap time of about 10 minutes, then the first program may be scheduled for recording.

Alternatively, if the overlap time is less than 10 minutes, then the control circuitry 304 (FIG. 3) determines the recording priority for each of the three programs. In certain embodiments, the first program, is deemed to have the lowest recording priority (step 1908), then the overlapping portion of the first may be cropped to allow for the second and third program to record (step 1910). However, the first program may be recorded at a later time when at least one of the second and third program has ended.

Instead, if the second program is determined by the control circuitry 304 (FIG. 3) to have the lowest priority (step 1912), then it may be cropped during the overlapping portion (step 1914) to allow for the first and third program to record in full. If the third program has the lowest, priority, then it may be cropped to allow the first and second programs to record in full (step 1916).

As noted above, the order in which the steps of the present method are performed is purely illustrative in nature. In fact, the steps can be performed in any order or in parallel, unless otherwise indicated by the present disclosure. The invention may be embodied in other specific forms without departing from the spirit or essential characteristics thereof. The forgoing embodiments are each therefore to be considered in all respects illustrative, rather than limiting of the invention.

What is claimed is:

1. A method of managing program recording schedules, comprising:
    retrieving from memory a schedule of recordings for a plurality of programs during a first time interval;
    determining whether a number of programs in the plurality of programs exceeds a predetermined number during the first time interval; and
    in response to determining that the number of programs exceeds the predetermined number:
        determining a recording priority of the plurality programs;
        retrieving a user-specified cropping threshold, wherein the user specified cropping threshold identifies a maximum amount permissible to crop from a program; and
        recording the plurality of programs while cropping a portion of at least one of the plurality of programs based on the recording priority such that a number of programs scheduled to be recorded during the first time interval is equal to or less than the predetermined number in response to determining that a size of the portion of the at least one of the plurality of programs that is cropped is less than the user-specified cropping threshold.

2. The method of claim 1, further comprising receiving a request for recording a program that at least partially overlaps, during a first time interval, with the plurality of programs previously scheduled for recording, wherein the plurality of programs includes the predetermined number of programs that can be recorded simultaneously during the time interval.

3. The method of claim 2, further comprising:
    determining a recording priority of the program for which the recording is requested in comparison with the plurality of programs; and
    recording the requested program and the plurality of programs while cropping a portion of at least one of the requested and plurality of programs during the time interval based on the recording priority of the requested program in response to determining that a size of the portion of the at least one of the requested and the plurality of programs that is cropped is less than the user-specified cropping threshold.

4. The method of claim 1, wherein a portion of a start time of a program overlaps with a portion of an end time of another one of the plurality of programs.

5. The method of claim 1, wherein determining the recording priority includes assigning a highest priority to the most recent program scheduled for recording in the schedule of recordings.

6. The method of claim 1, wherein a lowest recording priority program of the plurality of programs during the first time interval is cropped.

7. The method of claim 1, wherein the program recording schedule is managed by an interactive media guidance application.

8. The method of claim 1, wherein determining the recording priority of the plurality of programs is based on a recording priority ranking list.

9. A system for managing program recording schedules comprising:
    control circuitry; and
    a recording device, wherein the control circuitry is configured to:
        retrieve from memory a schedule of recordings for a plurality of programs during a first time interval;
        determine whether a number of programs in the plurality of programs exceeds a predetermined number during the first time interval; and
        in response to determining that the number of programs exceeds the predetermined number:
            determine a recording priority of the plurality programs;
            retrieve a user-specified cropping threshold, wherein the user specified cropping threshold identifies a maximum amount permissible to crop from a program; and
            direct the recording device to record the plurality of programs while cropping a portion of at least one of the plurality of programs based on the recording priority such that a number of programs scheduled to be recorded during the first time interval is equal to or less than the predetermined number in response to determining that a size of the portion of the at least one of the plurality of programs that is cropped is less than the user-specified cropping threshold.

10. The system of claim 9, wherein the control circuitry is further configured to receive a request for recording a program that at least partially overlaps, during a first time interval, with the plurality of programs previously scheduled for recording, wherein the plurality of programs includes the predetermined number of programs that can be recorded simultaneously during the time interval.

11. The system of claim 10, wherein the control circuitry is further configured to:
   determine a recording priority of the program for which the recording is requested in comparison with the plurality of programs; and
   direct the recording a device to record the requested program and the plurality of programs while cropping a portion of at least one of the requested and plurality of programs during the time interval based on the recording priority of the requested program in response to determining that a size of the portion of the at least one of the requested and the plurality of programs that is cropped is less than the user-specified cropping threshold.

12. The system of claim 9, wherein a portion of a start time of a program overlaps with a portion of an end time of another one of the plurality of programs.

13. The system of claim 9, wherein the control circuitry is configured to assign a highest priority to the most recent program scheduled for recording in the schedule of recordings.

14. The system of claim 9, wherein the control circuitry is configured to crop a lowest recording priority program of the plurality of programs during the first time interval.

15. The system of claim 9, wherein the control circuitry is configured with an interactive media guidance application for managing the program recording schedule.

16. The system of claim 9, wherein the control circuitry is configured to determine the recording priority of the plurality of programs based on a recording priority ranking list.

17. The method of claim 1, further comprising:
   based on the recording priority, identifying a first program of the plurality of programs and a second program of the plurality of programs, wherein the first program has a first priority that is lower relative to a second priority of a second program; and
   recording the plurality of programs while cropping a portion of the first program.

18. The method of claim 17, further comprising:
   retrieving a user-specified limit associated with the first program, wherein the user specified limit identifies a maximum amount permissible to crop from the first program;
   identifying a portion of the first program such that cropping the portion of the first program causes reducing the number of programs scheduled to be recorded;
   determining whether a size of the portion of the first program exceeds the user-specified limit associated with the first program;
   in response to determining that the size of the portion of the first program does not exceed the user-specified limit associated with the first program, recording the plurality of programs while cropping the portion of the first program; and
   in response to determining that the size of the portion of the first program exceeds the user-specified limit associated with the first program, recording each of the plurality of programs excluding the first program, wherein each recording is not cropped.

19. The system of claim 9, wherein the control circuitry is further configured to:
   based on the recording priority, identify a first program of the plurality of programs and a second program of the plurality of programs, wherein the first program has a first priority that is lower relative to a second priority of a second program; and
   record the plurality of programs while cropping a portion of the first program.

20. The system of claim 19, wherein the control circuitry is further configured to:
   retrieve a user-specified limit associated with the first program, wherein the user specified limit identifies a maximum amount permissible to crop from the first program;
   identifying a portion of the first program such that cropping the portion of the first program causes reducing the number of programs scheduled to be recorded;
   determine whether a size of the portion of the first program exceeds the user-specified limit associated with the first program;
   in response to determining that the size of the portion of the first program does not exceed the user-specified limit associated with the first program, record the plurality of programs while cropping a portion of the first program; and
   in response to determining that the size of the portion of the first program exceeds the user-specified limit associated with the first program, record each of the plurality of programs excluding the first program, wherein each recording is not cropped.

* * * * *